(12) United States Patent
Morikawa et al.

(10) Patent No.: US 9,025,887 B2
(45) Date of Patent: May 5, 2015

(54) AREA FINDING APPARATUS, NON-TRANSITORY COMPUTER READABLE STORAGE MEDIUM, AND METHOD OF FINDING AREA

(75) Inventors: Hiroaki Morikawa, Kawasaki (JP); Tatsuya Asai, Kawasaki (JP); Hiroya Inakoshi, Kawasaki (JP); Shinichiro Tago, Kawasaki (JP); Nobuhiro Yugami, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 634 days.

(21) Appl. No.: 13/347,287

(22) Filed: Jan. 10, 2012

(65) Prior Publication Data

US 2012/0183227 A1     Jul. 19, 2012

(30) Foreign Application Priority Data

Jan. 13, 2011   (JP) ................. 2011-004973

(51) Int. Cl.
    *G06K 9/46*  (2006.01)
    *G06T 7/00*  (2006.01)
(52) U.S. Cl.
    CPC ..... *G06T 7/0083* (2013.01); *G06T 2207/20132* (2013.01)
(58) Field of Classification Search
    None
    See application file for complete search history.

(56) References Cited

U.S. PATENT DOCUMENTS

| | | | | | |
|---|---|---|---|---|---|
| 5,825,360 | A | * | 10/1998 | Odam et al. | 715/807 |
| 5,877,762 | A | * | 3/1999 | Young | 715/803 |
| 6,795,838 | B1 | * | 9/2004 | Kataoka | 708/160 |
| 7,978,936 | B1 | * | 7/2011 | Casillas et al. | 382/305 |
| 2006/0008145 | A1 | * | 1/2006 | Kaku | 382/173 |
| 2007/0201744 | A1 | * | 8/2007 | Sanami | 382/173 |

OTHER PUBLICATIONS

Dobkin, David et al., "Computing the Maximum Bichromatic Discrepancy with Applications to Computer Graphics and Machine Learning", J. Comput. Syst. Sci. 52(3) Jun. 1, 1996, pp. 1-39.

* cited by examiner

*Primary Examiner* — Jayesh A Patel
(74) *Attorney, Agent, or Firm* — Fujitsu Patent Center

(57) ABSTRACT

An apparatus extracts an area having a highest score or a lowest score that is calculated based on evaluation values of points from a target area including a set of a plurality of points that can be distributed at two-dimensional coordinates. It determines whether the area extracted and an area overlapping a plurality of the target areas intersect with each other, and deletes an area having a lower score or a higher score out of the areas determined to intersect with each other. It selects an area having a highest score or a lowest score out of the areas extracted at the extracting and not deleted at the determining. One or a plurality of areas are generated as the target areas based on an area acquired by excluding the area selected from the target area and an area acquired by excluding the area deleted at the determining.

4 Claims, 18 Drawing Sheets

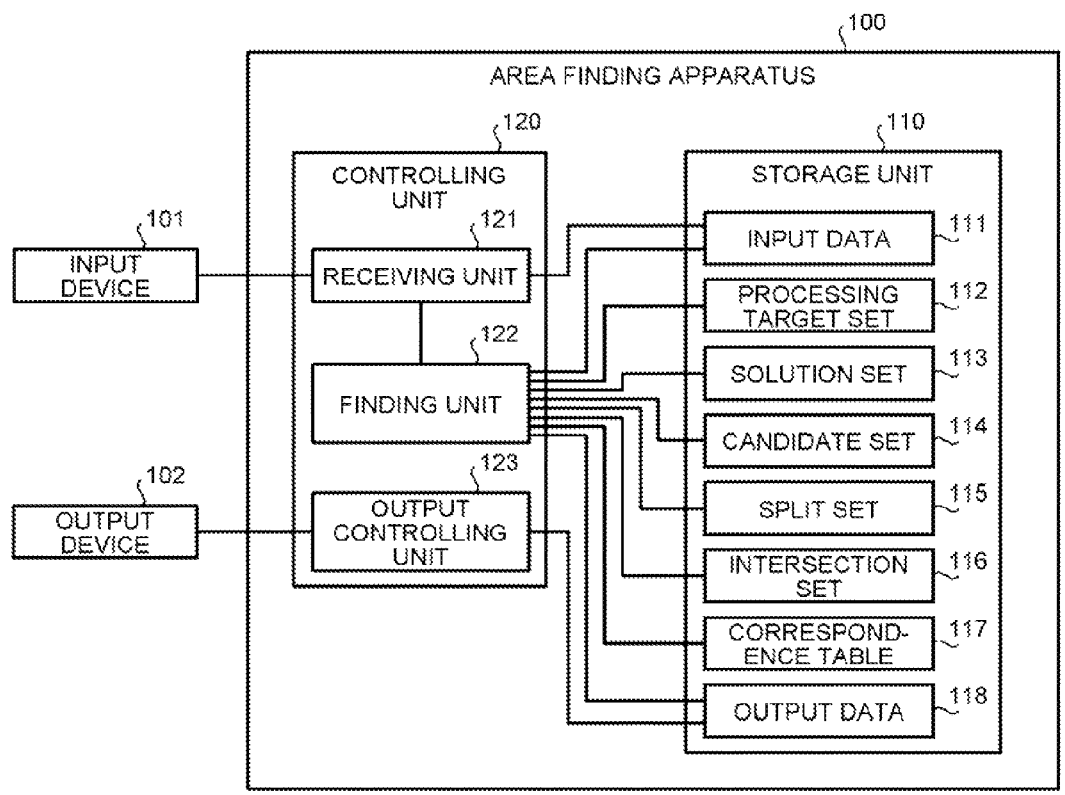

FIG.3

| ID | leftLow | rightUp | pointList |
|---|---|---|---|
| R-1 | (0.2, 0.2) | (0.8, 0.6) | (0.5, 0.3, 5.3), (0.7, 0.4, -3.2)··· |
| R-2 | (0.2, 0.3) | (0.7, 0.9) | (0.3, 0.6, 2.7), (0.5, 0.8, 4.5)··· |
| ⋮ | ⋮ | ⋮ | ⋮ |
| R-n | (0.3, 0.3) | (0.8, 0.6) | (0.6, 0.4, -6.2), (0.7, 0.5, 8.1)··· |

| ID | leftLow | rightUp | score |
|---|---|---|---|
| r-1 | (0.2, 0.3) | (0.4, 0.5) | 25 |
| r-2 | (0.5, 0.3) | (0.7, 0.6) | 18 |
| ⋮ | ⋮ | ⋮ | ⋮ |
| r-n | (0.4, 0.4) | (0.8, 0.5) | -10 |

| TargetID | ResultID |
|---|---|
| R-1 | r-1 |
| R-2 | r-2 |
| ⋮ | ⋮ |
| R-n | r-n |

Top1 ==> (0.5, 0.1) - (0.9, 0.7) score:20.0
Top2 ==> (0.1, 0.1) - (0.2, 0.9) score:18.0
Top3 ==> (0.3, 0.3) - (0.4, 0.5) score:-1.0

AREA FINDING APPARATUS, NON-TRANSITORY COMPUTER READABLE STORAGE MEDIUM, AND METHOD OF FINDING AREA

CROSS-REFERENCE TO RELATED APPLICATION

This application is based upon and claims the benefit of priority of the prior Japanese Patent Application No. 2011-004973, filed on Jan. 13, 2011, the entire contents of which are incorporated herein by reference.

FIELD

The embodiments discussed herein are directed to an area finding apparatus, a non-transitory computer readable storage medium, and a method of finding area.

BACKGROUND

Generally, there is a technique called an optimal area finding technique that is used, for example, for finding a region having the highest power consumption from a map, finding a region that is congested with cars from a map, or the like. The technique is implemented by solving an optimal area finding problem of "outputting an area having a maximum score when scores calculated based on evaluation values are defined for a set of point data having two-dimensional coordinates and the evaluation values.

Here, an example of a conventional technique for solving the optimal area finding problem will be described. FIG. 31 is a diagram illustrating the conventional technique. The two-dimensional coordinates illustrated in FIG. 31 represent a coordinate system in which the horizontal direction is set as the x axis, and the vertical direction is set as the y axis. Each point distributed on the two-dimensional coordinates has its evaluation value v. In other words, the point data is represented by (x, y, v). In the example illustrated in FIG. 31, each white dot (open circle) is a point of v=1, and each black dot (filled circle) is a point of v=−1.

In the example illustrated in FIG. 31, a case will be described in which an area, in which the sum of the evaluation values v of the points is the maximum, is to be found from an area R including a set of the points. For example, according to a conventional technique, two segments that pass through the points and are parallel to the x axis and two segments that pass through the points and are parallel to the y axis are selected. Then, rectangular areas surrounded by these four segments are listed, and the score of each rectangular area, that is, the sum of the evaluation values v of the points in each rectangular area is calculated. Then, by selecting the rectangular area for which the calculated score is the maximum, an optical area r is found from the area R.

David P. Dobkin, Dimitrios Gunopulos, Wolfgang Maass: Computing the Maximum Bichromatic Discrepancy with Applications to Computer Graphics and Machine Learning. J. Comput. Syst. Sci. 52(3): 453 to 470 (1996) is an example of the conventional technique.

SUMMARY

According to an aspect of an embodiment of the invention, an area finding apparatus includes a storage unit that stores data representing a plurality of points that can be distributed at two-dimensional coordinates; an extracting unit that extracts a rectangular area having a highest score or a lowest score that is calculated based on evaluation values of points from a processing target area including a set of a plurality of points stored in the storage unit; a determining unit that determines whether or not the rectangular area extracted by the extracting unit and one or a plurality of rectangular areas overlapping a plurality of the processing target areas out of other rectangular areas extracted from other processing target areas intersect with each other, and deletes a rectangular area having a lower score or a higher score out of the rectangular areas determined to intersect with each other; a selecting unit that selects a rectangular area having a highest score or a lowest score out of the rectangular areas extracted by the extracting unit and not deleted by the determining unit; a generating unit that generates one or a plurality of rectangular areas as the processing target areas based on an area acquired by excluding the rectangular area selected by the selecting unit from the processing target area from which the rectangular area has been extracted and an area acquired by excluding the rectangular area deleted by the determining unit from the processing target area from which the rectangular area has been extracted; and a controlling unit that allows the extracting unit to extract the rectangular area from the processing target area generated by the generating unit, allows the determining unit to determine whether or not the rectangular areas intersect with each other, and allows the selecting unit to select the rectangular area until the rectangular areas corresponding to a predetermined number are selected by the selecting unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram illustrating an example of the configuration of an area finding apparatus according to a first embodiment;

FIG. 2 is a diagram illustrating an example of input data;

FIG. 3 is a diagram illustrating an example of the data structure of a processing target set;

FIG. 4 is a diagram illustrating an example of the data structure of a solution set;

FIG. 5 is a diagram illustrating an example of the data structure of a correspondence table;

FIG. 6 is a diagram illustrating an example of output data;

DESCRIPTION OF EMBODIMENTS

As described previously, there is an optimal area finding technique. However, it is considered to be useful that top k areas according to the score can be found. For example, it is thought that new information such as the features or the trend of the regions having high power consumption can be found by finding top three regions according to the power consumption. Here, k is a natural number.

Figure 32:
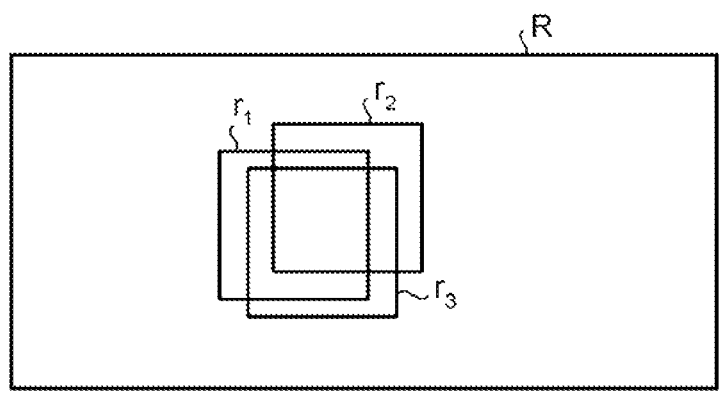
FIG. 32 is a diagram for describing the problem of the conventional technique.
Figure 33:
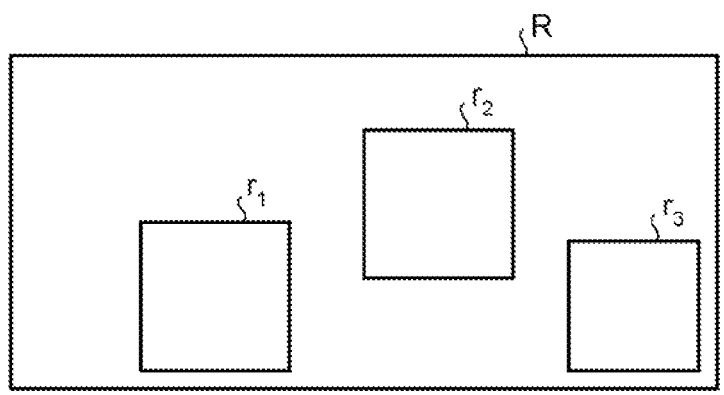
FIG. 33 is a diagram for describing the problem of the conventional technique.
Figure 34:
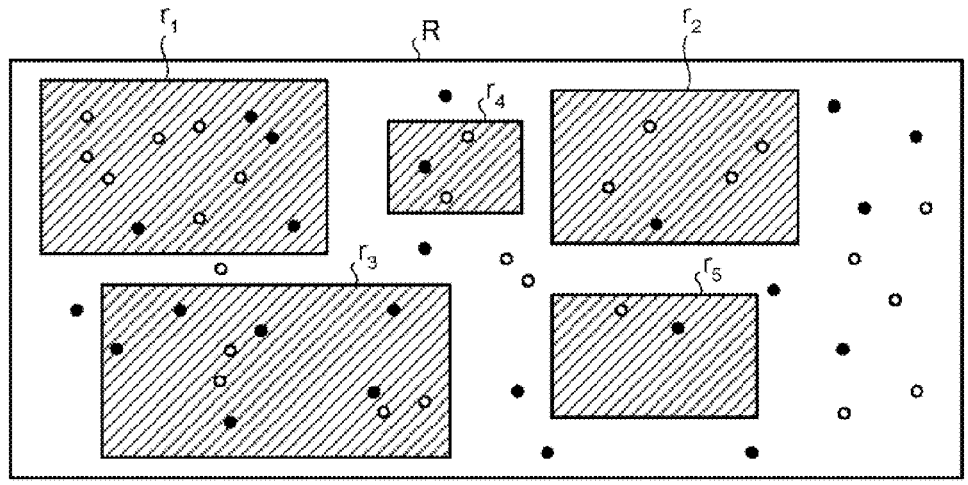
FIG. 34 is a diagram for describing the problem of the conventional technique.

Here, in a case where top k areas according to the score are simply selected by using the scores of the areas that are calculated according to the conventional technique, only similar areas are selected, and, accordingly, the acquired information is a little. For example, as illustrated in FIG. 32, even in a case where areas $r_1$, $r_2$, and $r_3$ are found from an area R, the acquired information is a little. Thus, it is demanded that top k different areas be found such that the areas do not intersect with each other. For example, as illustrated in FIG. 33, it is preferable to find areas $r_1$, $r_2$, and $r_3$ that do not intersect with each other from the area R, that is, to solve a problem of finding top k areas having no intersection therebetween. This is a problem of "outputting top k areas, which have no intersection therebetween, according to a score when the score calculated based on an evaluation value is defined for a set of point data that has two-dimensional coordinates and the evaluation value". By solving this problem, as illustrated in FIG. 34, a set of areas $r_i$ that do not intersect with each other can be found from the area R. Here, i is a natural number that satisfies the relation of "1≤i≤k". FIGS. 32 to 35C are diagrams illustrating the problems of the conventional technique.

However, there are rare techniques that can solve the problem of finding top k areas having no intersection therebetween.

Figure 35A:
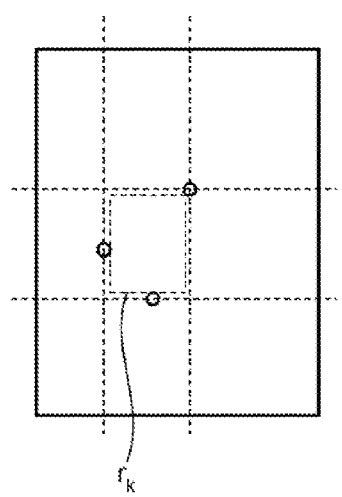
FIGS. 35A to 35C are diagram for describing the problem of the conventional technique.
Figure 35B:
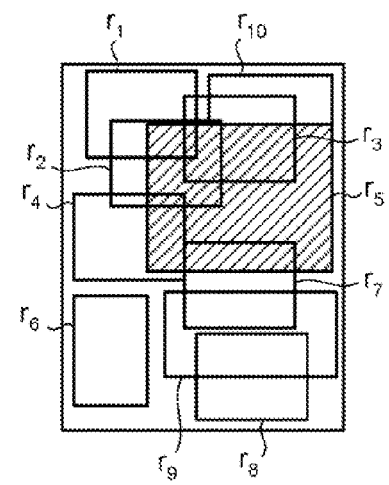
Figure 35C:
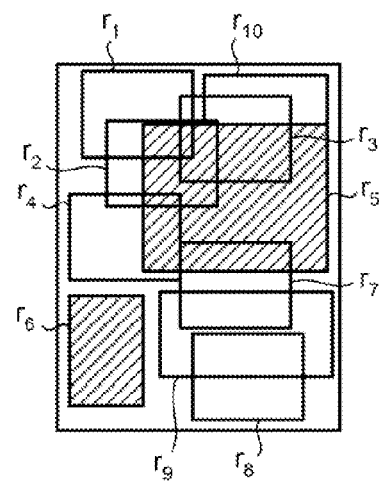

For example, a method may be considered which finds areas as illustrated in FIGS. 35A, 35B, and 35C by using a conventional technique. FIGS. 35A to 35C are a diagram illustrating the problem of the conventional technique. Shaded portions illustrated in FIGS. 35B and 35C indicate selected areas. As illustrated in FIG. 35A, according to this method, similarly to the conventional technique, areas $r_k$ enclosed by four segments are listed, and the scores of the areas are calculated. Then, as illustrated in FIG. 35B, an area $r_5$ is selected as the top area from among the areas. Then, as illustrated in FIG. 35C, as a candidate for a second highest area, an area $r_2$ is selected, and it is determined whether or not the area $r_2$ intersects with the area $r_5$. In such a case, since the area $r_2$ intersects with the area $r_5$, the area $r_2$ is excluded from the candidate. Then, an area $r_6$ having the next highest score is selected as a candidate for the second highest area, and it is determined whether the area $r_6$ intersects with the area $r_5$. In such a case, since the area $r_6$ does not intersect with the area $r_5$, the area $r_6$ is set as the second highest area. Thereafter, according to this embodiment, every when the i-the highest candidate is selected, it is determined whether or not the candidate intersects with the areas up to the (i−1)-th highest area, which have already been selected, and only not-intersecting areas are selected, the problem of finding top k areas having no intersection therebetween is solved. However, according to this method, every when a candidate area is selected, the intersection thereof with each one of the areas that have already been selected is determined, and accordingly, the processing efficiency may be low.

Preferred embodiments of the present invention will be explained with reference to accompanying drawings. However, the invention is not limited to the embodiments. In addition, the embodiments can be appropriately combined in the range in which the processing contents are not contradictory to each other.

[a] First Embodiment

An example of the configuration of an area finding apparatus according to a first embodiment will be described. FIG. 1 is a diagram illustrating the configuration of the area finding apparatus according to the first embodiment. As illustrated in FIG. 1, an area finding apparatus 100 includes a storage unit 110 and a controlling unit 120. In addition, the area finding apparatus 100 is connected to an input device 101 and an output device 102.

The input device 101 receives the input of various kinds of information. For example, the input device 101 receives the input of information including a set of point data distributed at two-dimensional coordinates. In addition, for example, the input device 101 receives the input of information that represents the definition of a score calculated based on an evaluation value of the point data. The definition of the score, for example, is a sum of evaluation values of each point data. For example, the input device 101 corresponds to a keyboard, a mouse, a medium reading device, or the like. In addition, the definition of a score is not limited to the above-described example. For example, the definition of a score may be a sum of evaluation values of each point data per area of each area.

The output device 102 outputs various kinds of information. For example, the output device 102 outputs information that represents top k areas according to the score. For example, the output device 102 corresponds to a display, a monitor, a speaker, or the like.

The storage unit 110 includes input data 111, a processing target set 112, a solution set 113, a candidate set 114, a split set 115, an intersection set 116, a correspondence table 117, and output data 118. The storage unit 110 corresponds to a storage device such as a semiconductor memory element including a random access memory (RAM), a read only memory (ROM), a flash memory, and the like, a magnetic disk device, an optical disk device, or a magneto optical disk.

The input data 111 is information that includes a set of point data. This point data, for example, is distributed at two-dimensional coordinates and is information of a point that has an evaluation value. FIG. 2 is a diagram illustrating an example of the input data. As illustrated in FIG. 2, the input data 111, for example, is information in which a coordinate "x" in the horizontal direction, a coordinate "y" in the vertical direction, and an evaluation value "v" are associated with one another. The input data 111 is an example of the storage unit.

As illustrated in FIG. 2, for example, the input data 111 includes information in which x "0.2", y "0.9", and v "9.0" are associated with one another. In other words, the input data 111 represents that there is a point "(0.2, 0.9, 9.0)" that has an evaluation value of "9.0" at coordinates "(0.2, 0.9)". In addition, the input data 111 includes similar information of the other points. In addition, the evaluation value v is not limited to one-dimensional data and, for example, may be multi-dimensional data. Furthermore, the point data is not limited to the data distributed at two-dimensional coordinates and, for example, may include data such as numerical data that can be distributed in an area included in a multi-dimensional coordinate system.

The processing target set 112 is a set of areas as processing targets of a finding unit 122 to be described later. For example, the processing target set 112 is a set of processing target areas, which have arbitrary sizes, including point data of a plurality of points distributed in the two-dimensional coordinates. The processing target area, for example, is a rectangular area that is enclosed by four segments. FIG. 3 is a diagram illustrating an example of the data structure of the processing target set. As illustrated in FIG. 3, the processing target set 112, for example, includes information in which an "ID", a "leftLow", a "rightUp", and a "pointList" are associated with one another for each processing target area. Among these, the ID represents identification information used for uniquely identifying each processing target area. The leftLow represents the lower left coordinates of the rectangle. In addition, the rightUp represents the coordinates of the upper right of the rectangle. The pointList represents the point data of a plurality of points included in the processing target area. Here, the processing target set 112 may be also referred to as a target.

As illustrated in FIG. 3, for example, the processing target set 112 includes information in which an ID of "R-1", a leftLow of "(0.2, 0.2)", and a rightUp of "(0.8, 0.6)" are associated with one another. In addition, the processing target set 112 includes information in which an ID of "R-1" and a pointList of "(0.5, 0.3, 5.3), (0.7, 0.4, −3.2), . . . " are associated with each other. In other words, the processing target set 112 is represented such that the processing target area R-1 is a rectangular area enclosed by four segments x=0.2, y=0.2, x=0.8, and y=0.6, and includes a plurality of points such as a point (0.5, 0.3, 5.3), a point (0.7, 0.4, −3.2), and the like. In addition, the processing target set 112 includes similar information of other processing target areas. Here, as the method of representing a rectangle, although a method of representing a rectangle by using lower left coordinates and upper right coordinates has been described, the method is not limited thereto. For example, the method of representing a rectangular area may be a method using equations of four segments forming a rectangular shape. In the description below, as the method of representing a rectangular area, a method using the lower left coordinates and the upper right coordinates will be used.

The solution set 113 is a set of areas as solutions. For example, the solution set 113 is a set of solution areas including the top area to the k-th highest areas that are acquired by the finding unit 122. FIG. 4 is a diagram illustrating an example of the data structure of the solution set. As illustrated in FIG. 4, the solution set 113, for example, includes information in which an "ID", a "leftLow", a "rightUp", and "score" are associated with one another for each solution area. Among there, the ID represents identification information that is used for uniquely identifying a solution area. The score represents a score that is calculated based on the evaluation values v of the point data of a plurality of points included in the solution area. Here, the solution set 113 may be also referred to as an output.

As illustrated in FIG. 4, for example, the solution set 113 includes information in which an ID of "r-1", a leftLow of "(0.2, 0.3), a rightUp of "(0.4, 0.5)", and a score of "25" are associated with one another. In other words, the solution set 113 is represented such that the solution area r-1 is a rectangular area enclosed by four segments x=0.2, y=0.3, x=0.4, and y=0.5, and the score of the solution area r-1 is 25. In addition, the solution set 113 includes similar information of the other solution areas.

The candidate set 114 is a set of areas as candidates for the solution areas. For example, the candidate set 114 is a set of candidate areas extracted from the processing target area. The candidate set 114 has a data structure similar to that of the solution set 113 illustrated in FIG. 4. As illustrated in FIG. 4, the candidate set 114, for example, includes information in which an "ID", a "leftLow", a "rightUp", and a "score" are associated with one another for each candidate area. Among these, the ID represents identification information used for uniquely identifying each candidate area. Here, as the ID of the candidate area, the same ID as the ID of the solution area may be used. The candidate area is an example of the solution candidate. Here, the candidate set 114 may be also referred to as a candidate.

The split set 115 is a set of processing target areas that are targets of a split process performed by the finding unit 122. For example, the split set 115 is a set of the processing target areas from which the solution areas are extracted by the finding unit 122. The split set 115 has a data structure similar to that of the processing target set 112 illustrated in FIG. 3. As illustrated in FIG. 3, the split set 115, for example, includes information in which the "ID", the "leftLow", the "rightUp", and the "pointList" are associated with one another for each processing target area. Here, the split set 115 may be also referred to as a split.

The intersection set 116 is a set of candidate areas that are targets of an intersection determining process performed by the finding unit 122. For example, the intersection set 116 is a set of the candidate areas that overlap a plurality of the processing target areas out of the candidate areas. The intersection set 116 has a data structure similar to that of the solution set 113 illustrated in FIG. 4. As illustrated in FIG. 4, the intersection set 116, for example, includes information in which the "ID", the "leftLow", the "rightUp", and the "score" are associated with one another for each candidate area. The intersection set 116 is an example of a temporary storage unit. Here, the intersection set 116 may be also referred to as an intersection.

In the correspondence table 117, the processing target area and the candidate area extracted from the processing target area are stored in association with each other. FIG. 5 is a diagram illustrating an example of the data structure of the correspondence table. As illustrated in FIG. 5, in the correspondence table 117, for example, a "TargetID" and a "ResultID" are stored in association with each other. Among these, the TargetID represents the ID of the processing target area. The ResultID represents the ID of the candidate area.

As illustrated in FIG. 5, for example, in the correspondence table 117, a TargetID "R-1" and a ResultID "r-1" are stored in association with each other. In other words, the correspondence table 117 represents that the candidate area r-1 is extracted from the processing target area R-1. In addition, in the correspondence table 117, similar information of the other processing target areas is included.

The output data 118 is information that includes top k areas according to the score. For example, the output data 118 includes top three areas according to the score out of the set of the point data. FIG. 6 is a diagram illustrating an example of the output data. As illustrated in FIG. 6, for example, the output data 118 includes "Top1==>(0.5, 0.1)–(0.9, 0.7) score: 20.0". In other words, the output data 118 represents that the top area is a rectangular area enclosed by four segments x=0.5, y=0.1, x=0.9, and y=0.7, and the score of the top area is 20.0. In addition, the output data 118 includes similar information of the other areas of different ranks.

The controlling unit 120 includes a receiving unit 121, a finding unit 122, and an output controlling unit 123. The controlling unit 120, for example, corresponds to an integrated device such as an application specific integrated circuit (ASIC) or a field programmable gate array (FPGA). In addition, the controlling unit 120, for example, corresponds to an electronic circuit such as a central processing unit (CPU) or a micro processing unit (MPU).

The receiving unit 121 receives various kinds of information from the input device 101. For example, the receiving unit 121 receives information including a set of point data distributed at two-dimensional coordinates from the input device 101 and stores the received information in the storage unit 110 as the input data 111. In addition, the receiving unit 121 receives information representing the definition of a score that is calculated based on the evaluation value of the point data from the input device 101 and outputs the received information to the finding unit 122.

The finding unit 122 finds top k areas according to the score from the set of the point data. For example, the finding unit 122 finds the top k areas by repeatedly performing a process of finding the solution area of the next rank from the area acquired from excluding the solution area, which has been found, from the processing target areas and a process of determining whether or not the found solution area intersects only with the candidate area that overlaps a plurality of the processing target areas. In addition, the finding unit 122 is an example of a storage unit, an extracting unit, a finalization unit, a selecting unit, a generating unit, and a controlling unit.

Hereinafter, the process of the finding unit 122 will be described. The finding unit 122 generates the processing target area based on the input data 111. For example, the finding unit 122 generates a smallest rectangular area including all the points of the input data 111 as the processing target area.

For example, the finding unit 122 acquires a minimum coordinate $x_{min}$ and a maximum coordinate $x_{max}$ out of x coordinates of all the points included in the input data. In addition, the finding unit 122 acquires a minimum coordinate $y_{min}$ and a maximum coordinate $y_{max}$ out of y coordinates of all the points included in the input data. The finding unit 122 determines the lower left coordinates ($x_{min}$, $y_{min}$) and the upper right coordinates ($x_{max}$, $y_{max}$) of the rectangular area by using the acquired coordinates. The finding unit 122 generates the rectangular area represented by the determined coordinates as the processing target area R and stores the generated processing target area R in the processing target set 112.

In addition, the finding unit 122 extracts an area having the highest score from the processing target area as a candidate area. For example, for all the points included in the processing target area R, the finding unit 122 selects two segments in the horizontal direction which pass through the points and two segments in the vertical direction which passes through the points. Then, the finding unit 122 lists areas r enclosed by the four segments and calculates the score of each area r. Then, the finding unit 122 extracts an area having the highest score for each calculated area r as a candidate area r. In addition, the finding unit 122 stores the extracted candidate area r and the processing target area R from which the candidate area r has been extracted in the correspondence table 117 while associating them with each other.

In addition, the finding unit 122 finalizes the extracted candidate area r. For example, the finding unit 122 determines whether or not the extracted candidate area $r_i$ and the area $r_j$ included in the intersection set 116 intersect with each other. This determining process is also referred to as an intersection determination process.

Here, the intersection determination process performed by the finding unit 122 will be described. Here, for example, a case will be described in which it is determined whether or not an area A and an area B intersect with each other. The area A and the area B are areas represented as below.

A: ($Ax_{min}$, $Ay_{min}$)–($Ax_{max}$, $Ay_{max}$)
B: ($Bx_{min}$, $By_{min}$)–($Bx_{max}$, $By_{max}$)

For example, the finding unit 122 performs the intersection determination process by determining whether or not any one of the coordinates of four corners of the area A is included in the area B. For example, the finding unit 122 calculates lower left coordinates ($Ax_{min}$, $Ay_{min}$), upper left coordinates ($Ax_{min}$, $Ay_{max}$), lower right coordinates ($Ax_{max}$, $Ay_{min}$), and upper right coordinates ($Ax_{max}$, $Ay_{max}$). Then, the finding unit 122 determines that the area A and the area B intersect with each other in a case where one or more coordinates out of the calculated four coordinates satisfy the following Equation (1) and Equation (2).

$$Bx_{min} < x < Bx_{max} \quad (1)$$

$$By_{min} < y < By_{max} \quad (2)$$

On the other hand, the finding unit 122 determines that the area A and the area B do not intersect with each other in a case where all the coordinates of the calculated four coordinates do not satisfy Equation (1) and Equation (2) described above. Here, the method of determining the intersection is not limited to the above-described method. For example, the finding unit 122 may perform the intersection determination by determining whether or not any one of the coordinates of the four corners of the area B is included in the area A.

In a case where the candidate area $r_i$ and the candidate area $r_j$ intersect with each other, the finding unit 122 compares the score of the candidate area $r_i$ and the score of the candidate area $r_j$ together and determines whether or not the score of the candidate area $r_i$ is higher than the score of the candidate area $r_j$. In a case where the score of the candidate area $r_i$ is higher than the score of the candidate area $r_j$, the finding unit 122 finalizes the candidate area $r_i$ having the higher score as a candidate area and determines whether or not the candidate area $r_i$ overlaps a plurality of the processing target areas. As the determination method, for example, a method similar to the above-described method of determining the intersection is used. Described in detail, for example, the finding unit 122 determines that the candidate area $r_i$ overlaps the plurality of the processing target areas in a case where any one of the coordinates of the four corners of the candidate area $r_i$ is included in the processing target area other than the processing target area $R_i$. On the other hand, the finding unit 122 determines that the candidate area $r_i$ does not overlap the plurality of the processing target areas in a case where all the coordinates of the four corners of the candidate area $r_i$ are not included in the processing target areas other than the processing target area $R_i$.

In a case where the candidate area $r_i$ overlaps the plurality of the processing target areas, the finding unit 122 stores the candidate area $r_i$ in the candidate set 114 and the intersection set 116. On the other hand, in a case where the candidate area $r_i$ does not overlap the plurality of the processing target areas, the finding unit 122 stores the candidate area $r_i$ in the candidate set 114. In addition, the finding unit 122 excludes the candidate area $r_j$ having the lower score from the candidate set 114 and the intersection set 116. Then, the finding unit 122 stores the processing target area $R_j$ corresponding to the candidate area $r_j$ in the split set 115 by referring to the correspondence table 117. The finding unit 122 excludes the set of the candidate area $r_j$ and the processing target area $R_j$ corresponding thereto from the correspondence table 117.

On the other hand, in a case where the score of the candidate area $r_i$ is lower than the score of the candidate area $r_j$, the finding unit 122 stores the processing target area $R_i$ corresponding to the candidate area $r_i$ in the split set 115 by referring to the correspondence table 117. The finding unit 122 excludes the set of the candidate area $r_i$ and the processing target area $R_i$ corresponding thereto from the correspondence table 117.

In a case where the candidate area $r_i$ and the candidate area $r_j$ do not intersect with each other, the candidate area $r_i$ is finalized as the candidate area, and it is determined whether or not the candidate area $r_i$ overlaps the plurality of the processing target areas. In a case where the candidate area $r_i$ overlaps the plurality of the processing target areas, the finding unit 122 stores the candidate area $r_i$ in the candidate set 114 and the intersection set 116. On the other hand, in a case where the candidate area $r_i$ does not overlap the plurality of the processing target areas, the finding unit 122 stores the candidate area $r_i$ in the candidate set 114.

In addition, the finding unit 122 selects the candidate area having the highest score among the finalized candidate areas as a solution area. For example, the finding unit 122 compares the scores of the candidate areas included in the candidate set 114 and selects the candidate area $r_i$ having the highest score as the solution area $r_i$. Then, the finding unit 122 stores the selected solution area $r_i$ in the solution set 113. In addition, the finding unit 122 stores the processing target area $R_i$ corresponding to the solution area $r_i$ in the split set 115 by referring to the correspondence table 117.

In addition, the finding unit 122 generates one or a plurality of processing target areas from an area acquired by excluding the area from which the candidate area has been extracted from the processing target areas included in the split set 115. For example, the finding unit 122 acquires the processing target area R-i from the split set 115. The finding unit 122 splits the area acquired by excluding the candidate area r-i from the acquired processing target area R-i and generates new processing target areas R-1, R-2, R-3, and R-4. Then, the finding unit 122 stores the generated processing target areas R-1, R-2, R-3, and R-4 in the processing target set 112.

Figure 7:
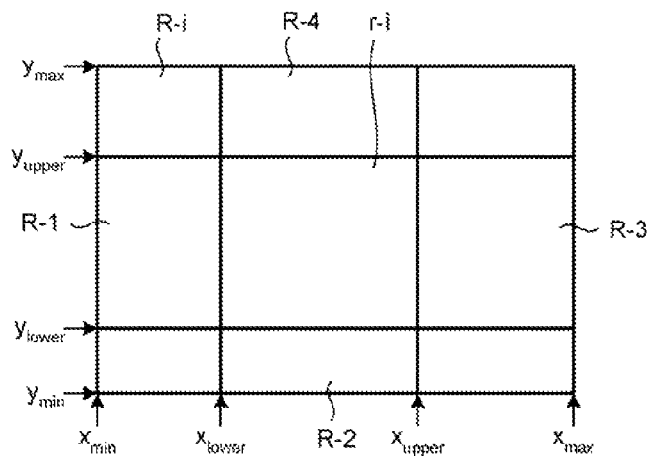
FIG. 7 is a diagram for describing a process of splitting a processing target area.

Here, the process of splitting a processing target area will be described with reference to FIG. 7. FIG. 7 is a diagram illustrating the process of splitting a processing target area. FIG. 7 illustrates a case in which an area acquired by excluding the candidate area r-i from the processing target area R-i is split into four processing target areas R-1, R-2, R-3, and R-4. Here, the processing target area R-i, the candidate area r-i, and the processing target areas R-1 to R-4 can be represented as below by using the coordinates ($x_{min}$, $x_{lower}$, $x_{upper}$, and $x_{max}$) in the horizontal direction and the coordinates ($y_{min}$, $y_{lower}$, $y_{upper}$, and $y_{max}$) in the vertical direction.

R-i: $(x_{min}, y_{min})-(x_{max}, y_{max})$
r-i: $x_{lower}, y_{lower})-(x_{upper}, y_{upper})$
R-1: $(x_{min}, y_{min})-(x_{lower}, y_{max})$
R-2: $(x_{min}, y_{min})-(x_{max}, y_{lower})$
R-3: $(x_{upper}, y_{min})-(x_{max}, y_{max})$
R-4: $(x_{min}, y_{upper})-(x_{max}, y_{max})$ As illustrated in FIG. 7, for example, the finding unit 122 acquires the processing target area R-i from the split set 115. The finding unit 122 acquires the candidate area r-i corresponding to the acquired processing target area R-i by referring to the correspondence table 117. The finding unit 122 splits the processing target area R-i by using a straight line passing through the left side of the candidate area r-i and generates a rectangular area enclosed by the left side of the processing target area R-i and the left side of the candidate area r-i as the processing target area R-1. In addition, the finding unit 122 splits the processing target area R-i by using a straight line passing through the lower side of the candidate area r-1 and generates a rectangular area enclosed by the lower side of the processing target area R-i and the lower side of the candidate area r-i as the processing target area R-2. Furthermore, the finding unit 122 splits the processing target area R-i by using a straight line passing through the right side of the candidate area r-i and generates a rectangular area enclosed by the right side of the processing target area R-i and the right side of the candidate area r-i as the processing target area R-3. In addition, the finding unit 122 splits the processing target area R-i by using a straight line passing through the upper side of the candidate area r-1 and generates a rectangular area enclosed by the upper side of the processing target area R-i and the upper side of the candidate area r-i as the processing target area R-4. Then, the finding unit 122 stores the generated processing target areas R-1, R-2, R-3, and R-4 in the processing target set 112 as new processing target areas R-1, R-2, R-3, and R-4.

In addition, the finding unit 122 generates the output data 118. For example, the finding unit 122 repeats a process in which candidate areas are extracted from the newly generated processing target areas, the candidate areas are finalized, and a solution area is selected from the candidate set 114 until the number of solution areas stored in the solution set 113 reaches a predetermined numerical value. Then, in a case where the number of solution areas reaches the predetermined numerical value, the finding unit 122 generates the output data 118 based on the information of the areas included in the solution set 113. For example, the finding unit 122 generates the output data 118 by associating the ranks of each area with the scores in order from the top area.

Next, the process of the finding unit 122 will be described in detail with reference to FIGS. 8 to 24. FIGS. 8 to 24 are diagrams illustrating the process of the finding unit in detail. In the example illustrated in FIGS. 8 to 24, a case will be described in which top three areas according to the score are to be found from the input data 111 by the finding unit 122.

Figure 8:
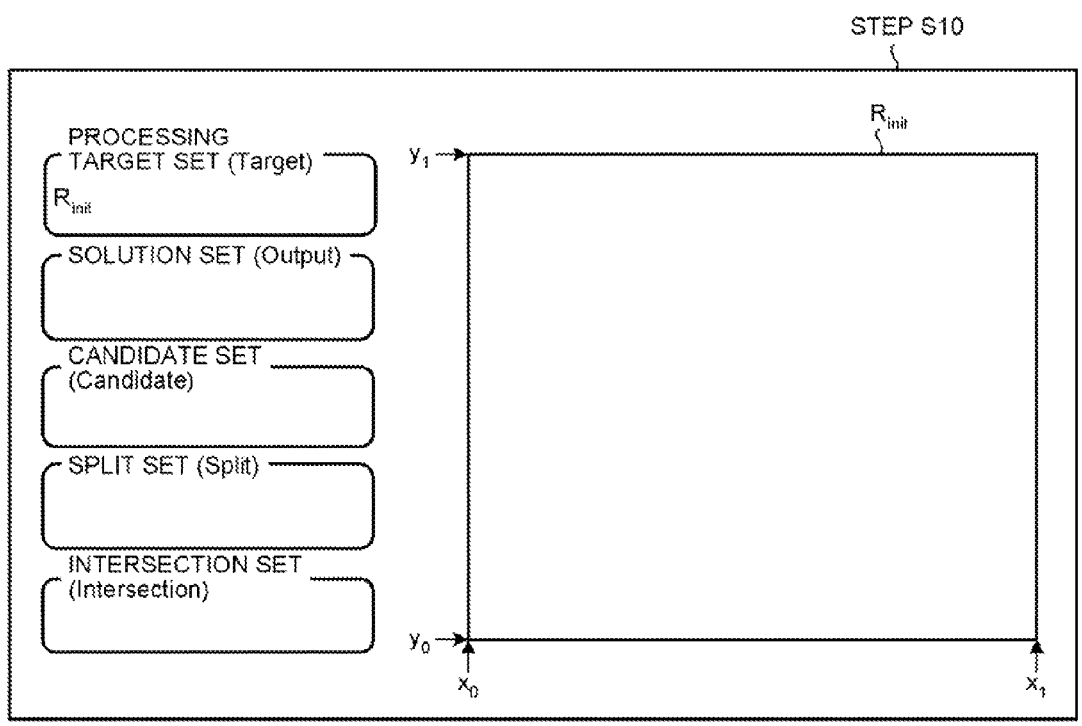
FIG. 8 is a diagram for describing the process of a finding unit in detail.

Now, the description will be presented with reference to FIG. 8. The finding unit 122 generates a processing target area $R_{init}$ based on the input data 111 at S10. For example, the finding unit 122 generates a smallest rectangular area including all the points of the input data 111 as the processing target area $R_{init}$. Then, the finding unit 122 stores the generated processing target area $R_{init}$ in the processing target set 112. The processing target area $R_{init}$ can be represented as below by using the coordinates ($x_0$ and $x_1$) in the horizontal direction and the coordinates ($y_0$ and $y_1$) in the vertical direction.

$R_{init}$: ($x_0$, $y_0$)–($x_1$, $y_1$)

Figure 9:
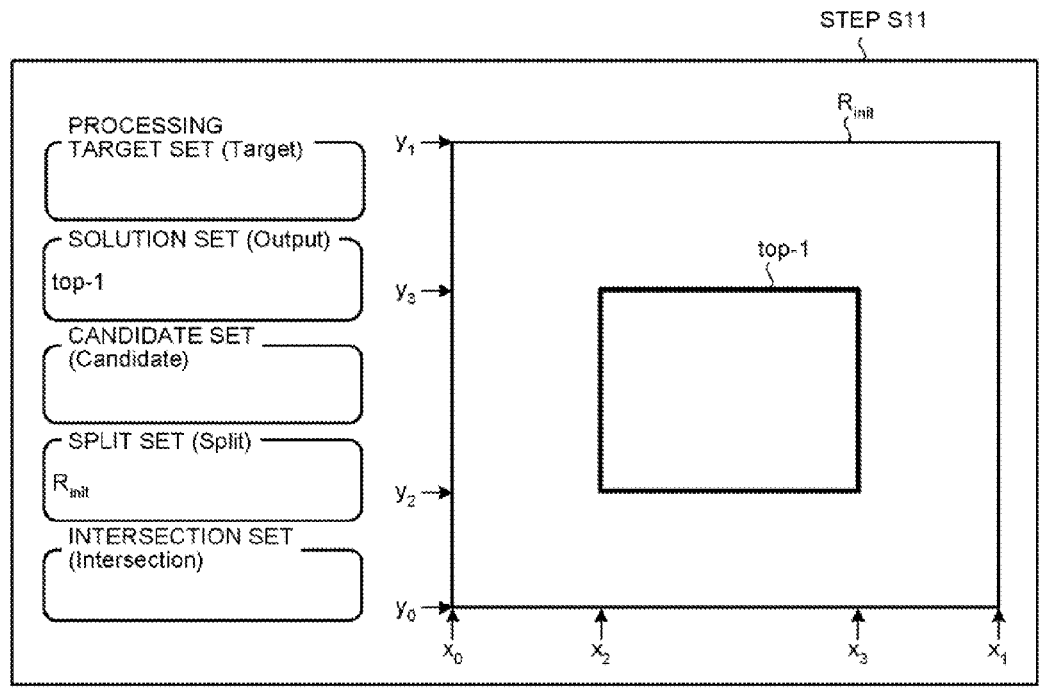
FIG. 9 is a diagram for describing the process of the finding unit in detail.

The description will be followed with reference to FIG. 9. The finding unit 122 extracts the highest score area top-1 from the processing target area $R_{init}$ included in the processing target set 112 and stores the extracted area top-1 in the solution set 113 at S11. The finding unit 122 stores the processing target area $R_{init}$ from which the area top-1 has been extracted in the split set 115. Here, the reason for storing the processing target area $R_{init}$ in the split set 115 is that areas top-2 and after that are included in an area acquired by excluding the area top-1 from the processing target area $R_{init}$. Here, the area top-1 can be represented as below by using the coordinates ($x_2$ and $x_3$) in the horizontal direction and the coordinates ($y_2$ and $y_3$) in the vertical direction.

top-1: ($x_2$, $y_2$)–($x_3$, $y_3$)

Figure 10:
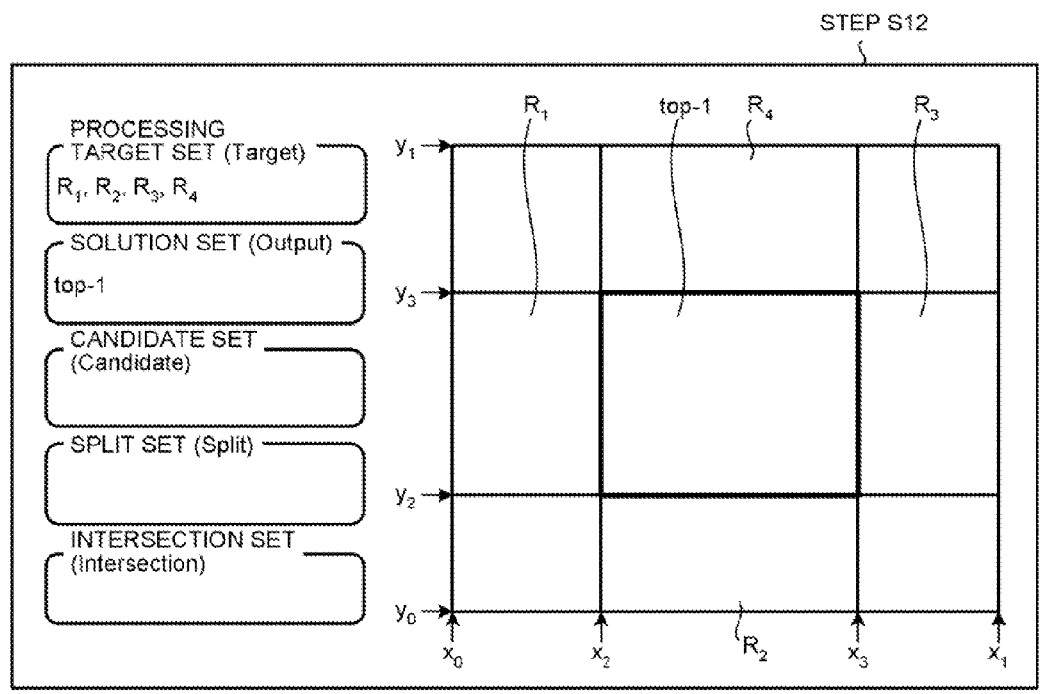
FIG. 10 is a diagram for describing the process of the finding unit in detail.

The description will be followed with reference to FIG. 10. The finding unit 122 acquires the processing target area $R_{init}$ from the split set 115. Then, the finding unit 122 generates processing target areas $R_1$ to $R_4$ based on the processing target area $R_{init}$ and stores the generated processing target areas $R_1$ to $R_4$ in the processing target set 112 at S12. Here, the processing target areas $R_1$ to $R_4$ can be represented as below by using the coordinates ($x_0$ to $x_3$) in the horizontal direction and the coordinates ($y_0$ to $y_3$) in the vertical direction.

$R_1$: ($x_0$, $y_0$)–($x_2$, $y_1$)
$R_2$: ($x_0$, $y_0$)–($x_1$, $y_2$)
$R_3$: ($x_3$, $y_0$)–($x_1$, $y_1$)
$R_4$: ($x_0$, $y_3$)–($x_1$, $y_1$)

Figure 11:
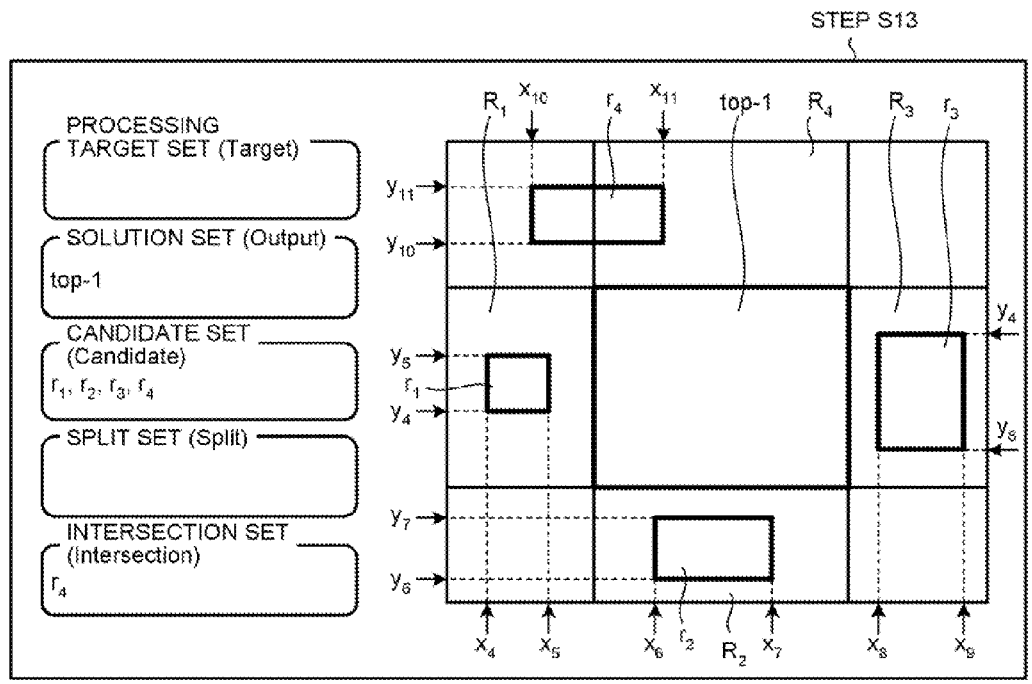
FIG. 11 is a diagram for describing the process of the finding unit in detail.

The description will be followed with reference to FIG. 11. The finding unit 122 acquires the processing target area $R_1$ from the processing target set 112. Then, the finding unit 122 extracts a highest-score area $r_1$ from the processing target area $R_1$ and stores the extracted area $r_1$ in the candidate set 114 as a candidate area at S13. From the other processing target areas $R_2$ to $R_4$, similarly, the finding unit 122 extracts each highest-score area $r_2$ to $r_4$ and stores the extracted areas $r_2$ to $r_4$ in the candidate set 114 as candidate areas. In addition, the finding unit 122 stores the extracted candidate areas $r_1$ to $r_4$ and the processing target areas $R_1$ to $R_4$ from which the candidate areas $r_1$ to $r_4$ have been extracted in the correspondence table 117 in association with each other. In addition, since the candidate area $r_4$ overlaps the plurality of the processing target areas, the finding unit 122 stores the candidate area $r_4$ in the intersection set 116. Here, the reason for storing the candidate area $r_4$ in the intersection set 116 is that there is a possibility that a candidate area extracted in a process performed later and the candidate area $r_4$ intersect with each other. In contrast to this, there is a little possibility that the candidate areas $r_1$ to $r_3$ overlap a candidate area extracted in a process performed later. Here, the candidate areas $r_1$ to $r_4$ can be represented as below by using the coordinates ($x_4$ to $x_{11}$) in the horizontal direction and the coordinates ($y_4$ to $y_{11}$) in the vertical direction.

$r_1$: ($x_4$, $y_4$)–($x_5$, $y_5$)
$r_2$: ($x_6$, $y_6$)–($x_7$, $y_7$)
$r_3$: ($x_8$, $y_8$)–($x_9$, $y_9$)
$r_4$: ($x_{10}$, $y_{10}$)–($x_{11}$, $y_{11}$)

Figure 12:
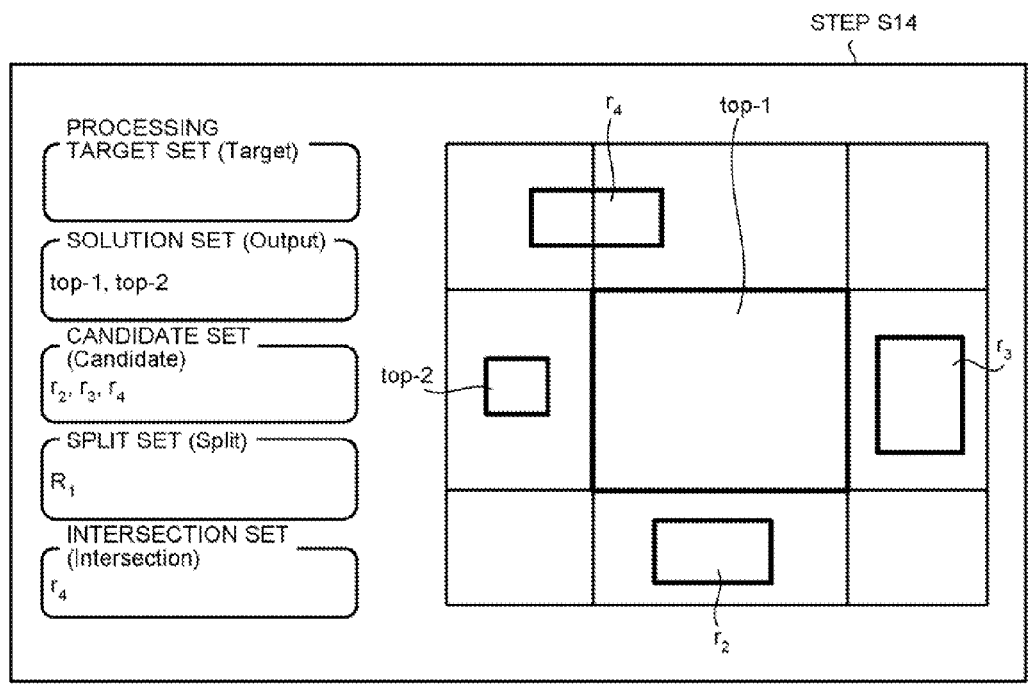
FIG. 12 is a diagram for describing the process of the finding unit in detail.

The description will be followed with reference to FIG. 12. Here, a case will be described in which the highest-score candidate area out of the candidate areas $r_1$ to $r_4$ is the candidate area $r_1$. In such a case, the finding unit 122 selects the highest-score candidate area $r_1$ from the candidate set 114 as an area top-2 and stores the selected area top-2 in the solution set 113 at S14. In addition, the finding unit 122 excludes the candidate area $r_1$ from the candidate set 114 and stores the processing target area $R_1$ corresponding to the candidate area $r_1$ in the split set 115 by referring to the correspondence table. The finding unit 122 excludes the set of the candidate area $r_1$ and the processing target area $R_1$ corresponding thereto from the correspondence table 117. Here, the reason for storing the processing target area $R_1$ in the split set 115 is that there is a possibility that an area top-3 or an area after that is included in an area acquired by excluding the area top-2 from the processing target area R.

Figure 13:
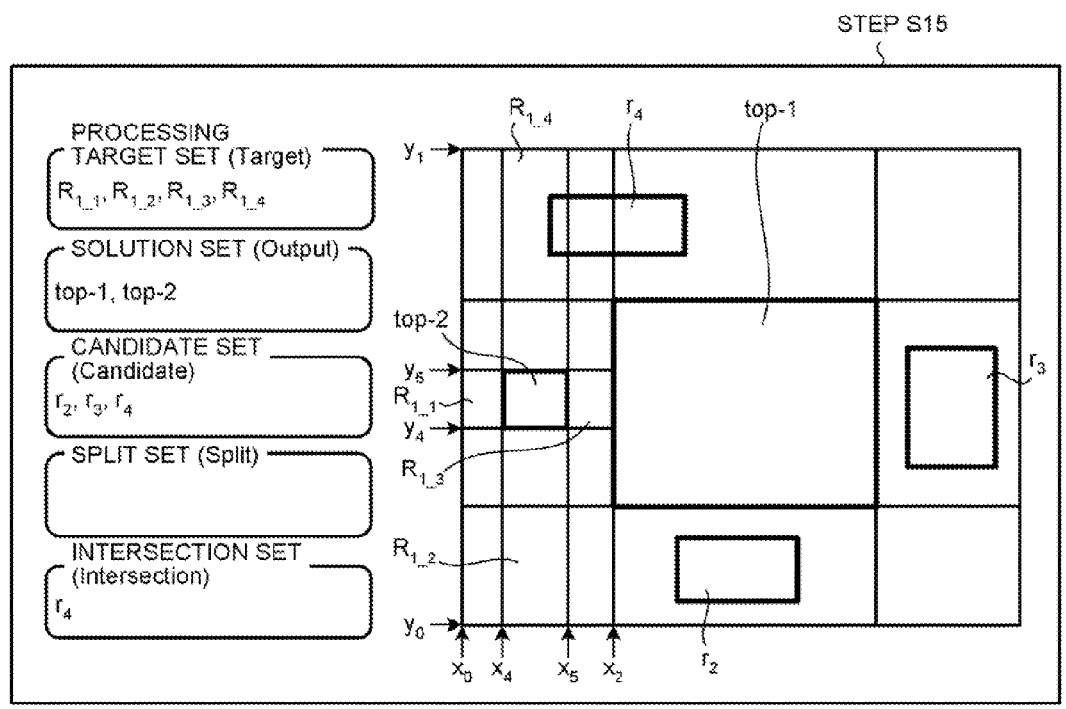
FIG. 13 is a diagram for describing the process of the finding unit in detail.

The description will be followed with reference to FIG. 13. The finding unit 122 acquires the processing target area $R_1$ from the split set 115. Then, the finding unit 122 generates processing target areas $R_{1\_1}$ to $R_{1\_4}$ based on the processing target area $R_1$ and stores the generated processing target areas $R_{1\_1}$ to $R_{1\_4}$ in the processing target set 112 at S15. Here, the processing target areas $R_{1\_1}$ to $R_{1\_4}$ can be represented as below by using the coordinates ($x_0$ to $x_5$) in the horizontal direction and the coordinates ($y_0$ to $y_5$) in the vertical direction.

$R_{1\_1}$: ($x_0$, $y_0$)–($x_4$, $y_1$)
$R_{1\_2}$: ($x_0$, $y_0$)–($x_2$, $y_4$)
$R_{1\_3}$: ($x_5$, $y_0$)–($x_2$, $y_1$)
$R_{1\_4}$: ($x_0$, $y_5$)–($x_2$, $y_1$)

Figure 14:
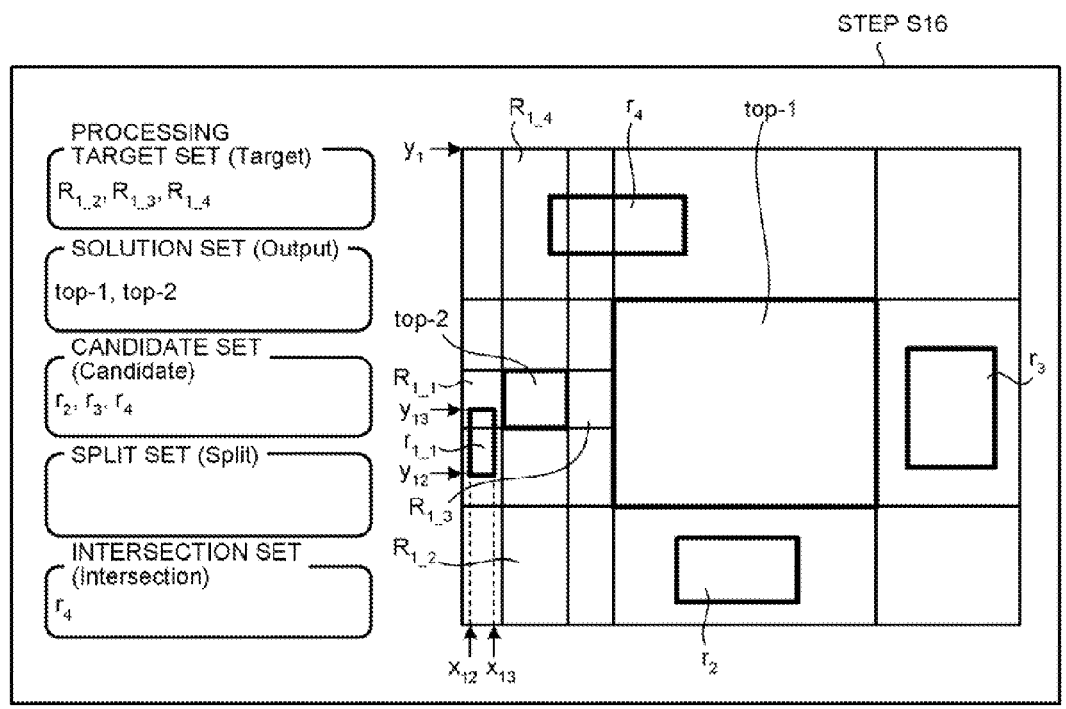
FIG. 14 is a diagram for describing the process of the finding unit in detail.
Figure 15:
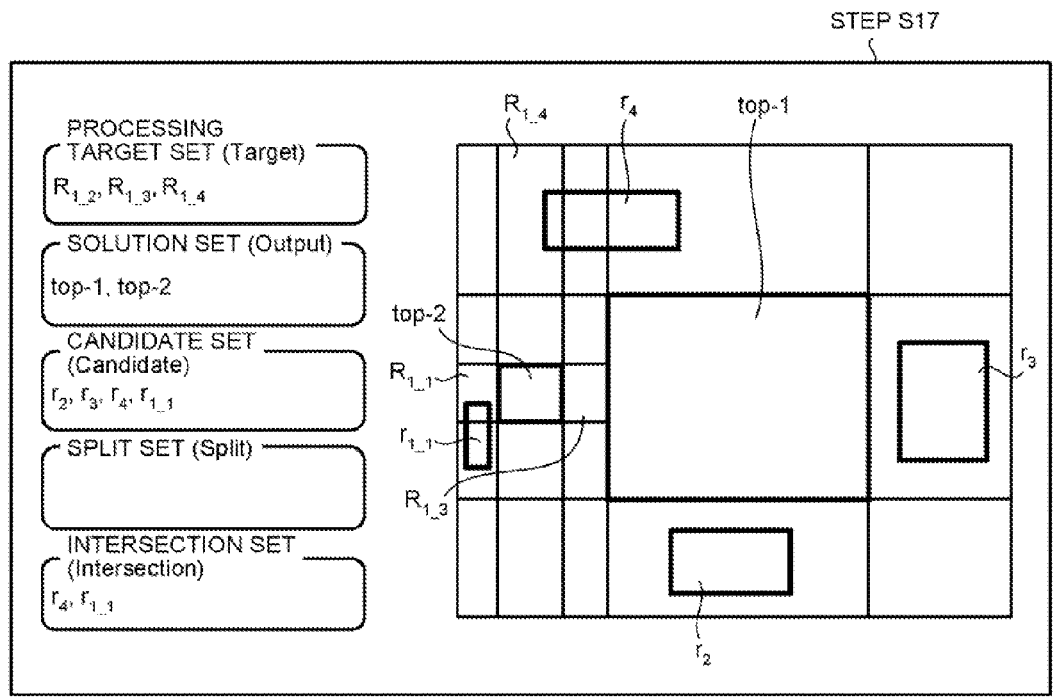
FIG. 15 is a diagram for describing the process of the finding unit in detail.

The description will be followed with reference to FIGS. 14 and 15. The finding unit 122 acquires the processing target area $R_{1\_1}$ from the processing target set 112 and extracts a highest-score area $r_{1\_1}$ from the acquired processing target area $R_{1\_1}$ at S16. The finding unit 122 stores the extracted candidate area $r_{1\_1}$ and the processing target area $R_{1\_1}$ from which the candidate area $r_{1\_1}$ has been extracted in the correspondence table 117 in association with each other. Here, the area $r_{1\_1}$ can be represented as below by using the coordinates ($x_{12}$ and $x_{13}$) in the horizontal direction and the coordinates ($y_{12}$ and $y_{13}$) in the vertical direction.

$r_{1\_1}$: ($x_{12}$, $y_{12}$)–($x_{13}$, $y_{13}$)

The finding unit 122 determines whether or not the extracted area $r_{1\_1}$ intersects with the candidate area $r_4$ included in the intersection set 116. In the case of FIG. 14, since the area $r_{1\_1}$ and the candidate area $r_4$ do not intersect with each other, the area $r_{1\_1}$ is stored in the candidate set 114 as a candidate area $r_{1\_1}$ at S17. In addition, since the candidate area $r_{1\_1}$ overlaps the plurality of the processing target areas, the finding unit 122 stores the candidate area $r_{1\_1}$ in the intersection set 116. Here, the reason for storing the candidate area $r_{1\_1}$ in the intersection set 116 is that there is a possibility that a candidate area extracted in a process performed later and the candidate area $r_{1\_1}$ intersect with each other.

Figure 16:
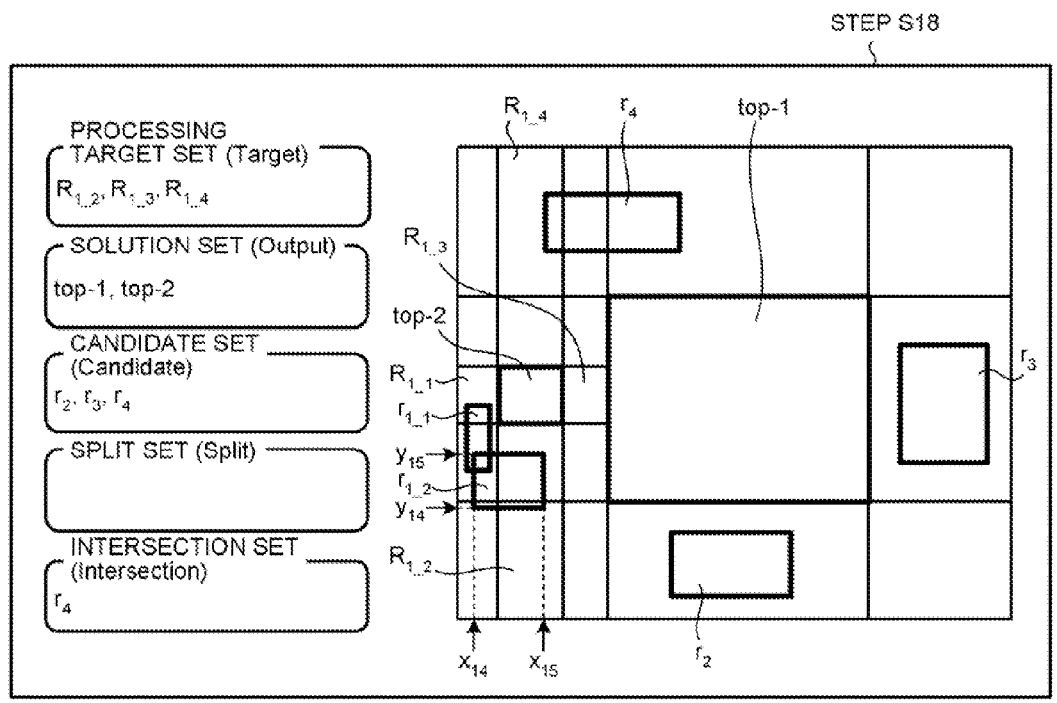
FIG. 16 is a diagram for describing the process of the finding unit in detail.
Figure 17:
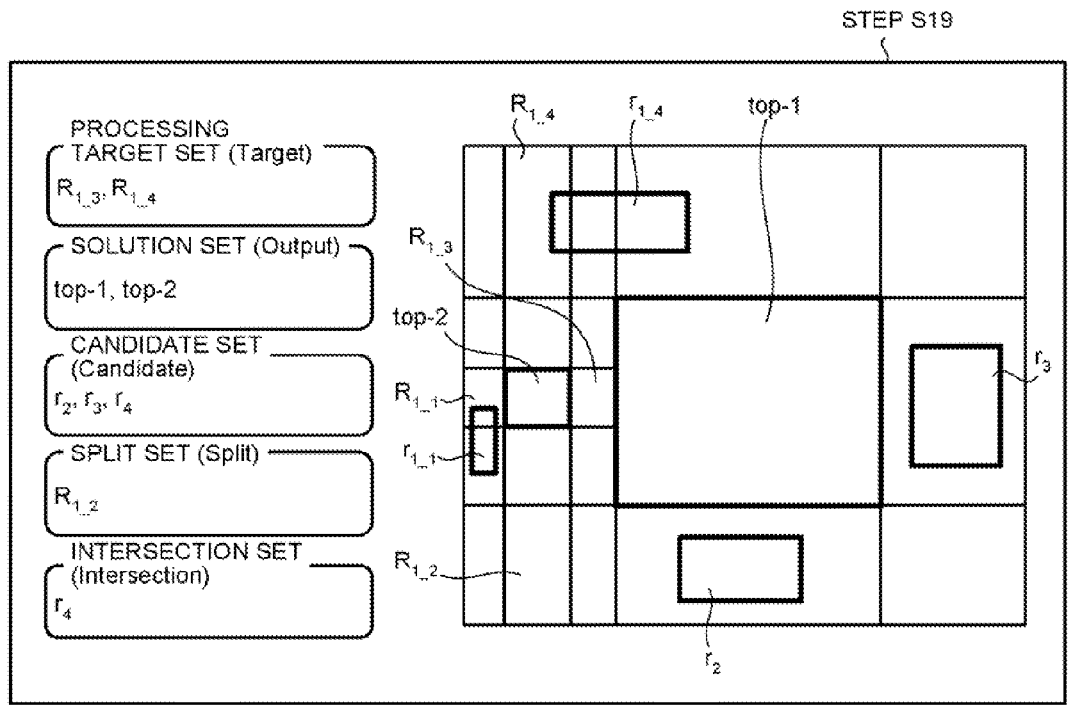
FIG. 17 is a diagram for describing the process of the finding unit in detail.

The description will be followed with reference to FIGS. 16 and 17. The finding unit 122 acquires the processing target area $R_{1\_2}$ from the processing target set 112 and extracts a highest-score area $r_{1\_2}$ from the acquired processing target area $R_{1\_2}$ at S18. The finding unit 122 stores the extracted candidate area $r_{1\_2}$ and the processing target area $R_{1\_2}$ from which the candidate area $r_{1\_2}$ has been extracted in the correspondence table 117 in association with each other. Here, the area $r_{1\_2}$ can be represented as below by using the coordinates ($x_{14}$ and $x_{15}$) in the horizontal direction and the coordinates ($y_{14}$ and $y_{15}$) in the vertical direction.

$r_{1\_2}$: ($x_{14}$, $y_{14}$)–($x_{15}$, $y_{15}$)

The finding unit 122 determines whether or not the extracted area $r_{1\_2}$ intersects with the candidate area $r_4$ or $r_{1\_1}$ included in the intersection set 116. In the case of FIG. 16, since the area $r_{1\_2}$ and the candidate area $r_{1\_1}$ intersect with each other, the finding unit 122 compares the score of the area $r_{1\_2}$ and the score of the candidate area $r_{1\_1}$. In FIG. 17, a case will be described in which the score of the area $r_{1\_2}$ is lower than the score of the candidate area $r_{1\_1}$. In such a case, the finding unit 122 stores the processing target area $R_{1\_2}$ corresponding to the area $r_{1\_2}$ in the split set 115 by referring to the correspondence table at S19. The finding unit 122 excludes the set of the candidate area $r_{1\_2}$ and the processing target area $R_{1\_2}$ corresponding thereto from the correspondence table 117. Here, the reason for storing the processing target area $R_{1\_2}$ in the split set 115 is that there is a possibility that an area top-4 or an area after that is included in the area acquired by excluding the area $r_{1\_2}$ from the processing target area $R_{1\_2}$.

Figure 18:
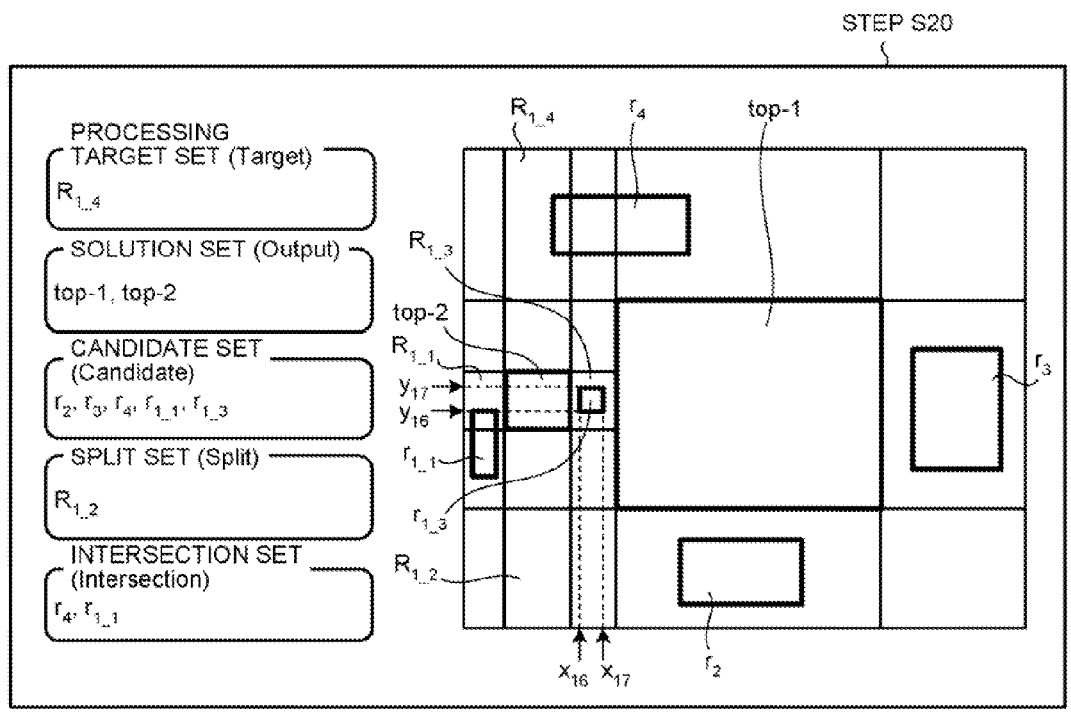
FIG. 18 is a diagram for describing the process of the finding unit in detail.

The description will be followed with reference to FIG. 18. The finding unit 122 acquires the processing target area $R_{1\_3}$ from the processing target set 112 and extracts a highest-score area $r_{1\_3}$ from acquired processing target area $R_{1\_3}$ at S20. In addition, the finding unit 122 stores the extracted candidate area $r_{1\_3}$ and the processing target area $R_{1\_3}$ from which the candidate area $r_{1\_3}$ has been extracted in the correspondence table 117 in association with each other. Here, the area $r_{1\_3}$ can be represented as below by using the coordinates ($x_{16}$ and $x_{17}$) in the horizontal direction and the coordinates ($y_{16}$ and $y_{17}$) in the vertical direction.

$r_{1\_3}$: ($x_{16}$, $y_{16}$)–($x_{17}$, $y_{17}$)

The finding unit 122 determines whether or not the extracted area $r_{1\_2}$ intersects with the candidate area $r_4$ or $r_{1\_1}$ included in the intersection set 116. In the case of FIG. 18, since the area $r_{1\_3}$ does not intersect with any candidate area, the finding unit 122 stores the candidate area $r_{1\_3}$ in the candidate set 114 as a candidate area $r_{1\_3}$.

Figure 19:
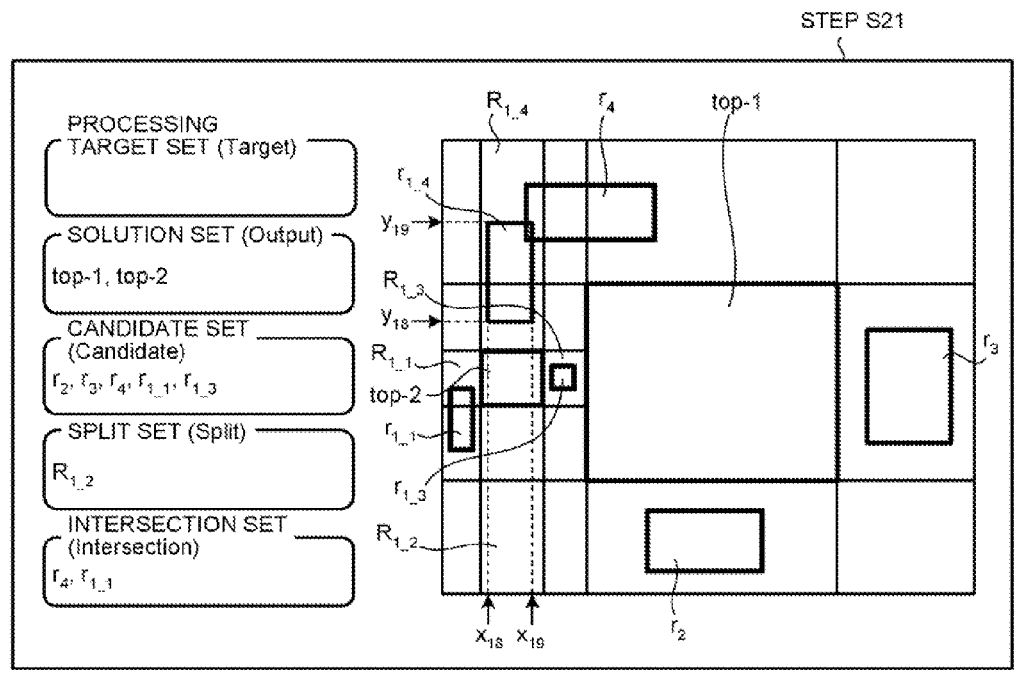
FIG. 19 is a diagram for describing the process of the finding unit in detail.
Figure 20:
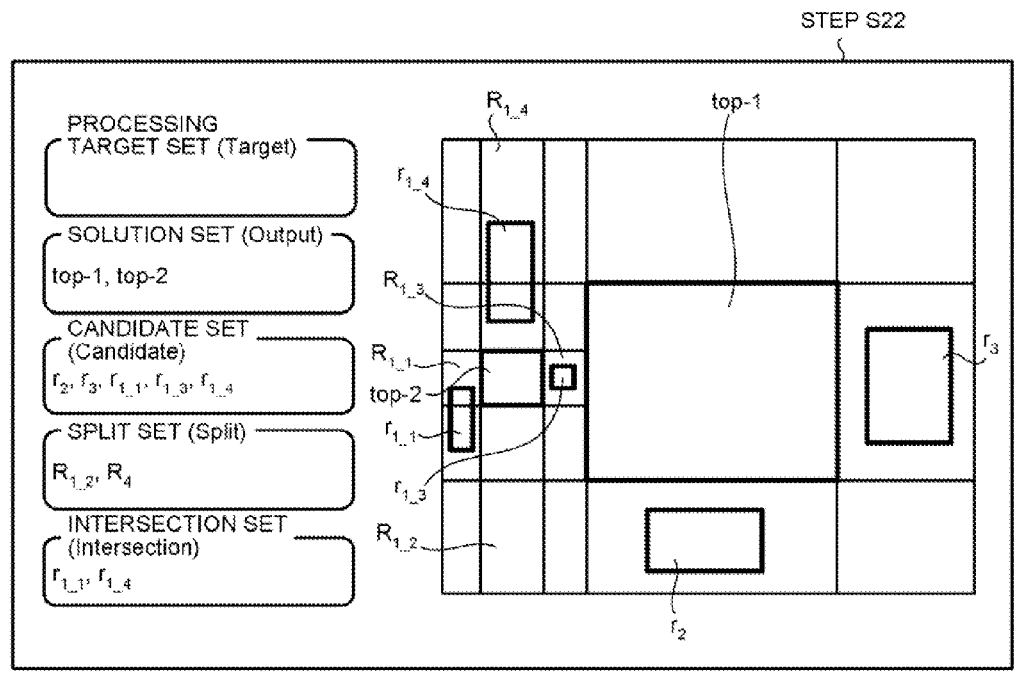
FIG. 20 is a diagram for describing the process of the finding unit in detail.

The description will be followed with reference to FIGS. 19 and 20. The finding unit 122 acquires the processing target area $R_{1\_4}$ from the processing target set 112 and extracts a highest-score area $r_{1\_4}$ from the acquired processing target area $R_{1\_4}$ at S21. The finding unit 122 stores the extracted candidate area $r_{1\_4}$ and the processing target area $R_{1\_4}$ from which the candidate area $r_{1\_4}$ has been extracted in the correspondence table 117 in association with each other. Here, the area $r_{1\_4}$ can be represented as below by using the coordinates ($x_{18}$ and $x_{19}$) in the horizontal direction and the coordinates ($y_{18}$ and $y_{19}$) in the vertical direction.

$r_{1\_4}$: ($x_{18}$, $y_{18}$)–($x_{19}$, $y_{19}$)

The finding unit 122 determines whether or not the extracted area $r_{1\_4}$ intersects with the candidate areas $r_4$ and $r_{1\_1}$ included in the intersection set 116. In the case of FIG. 19, since the area $r_{1\_4}$ and the candidate area $r_4$ intersect with each other, the finding unit 122 compares the score of the area $r_{1\_4}$ and the score of the candidate area $r_4$. In FIG. 20, a case will be described in which the score of the candidate area $r_{1\_4}$ is higher than the score of the candidate area $r_4$. In such a case, the finding unit 122 stores the area $r_{1\_4}$ having a higher score in the candidate set 114 as a candidate area $r_{1\_4}$ at S22. In addition, since the candidate area $r_{1\_4}$ overlaps the plurality of the processing target areas, the finding unit 122 stores the candidate area $r_{1\_4}$ in the intersection set 116. On the other hand, the finding unit 122 excludes the candidate area $r_4$ having a lower score from the candidate set 114 and the intersection set 116. Furthermore, the finding unit 122 stores the processing target area $R_4$ corresponding to the area $r_4$ in the split set 115 by referring to the correspondence table. The finding unit 122 excludes the set of the candidate area $r_4$ and the processing target area $R_4$ corresponding thereto from the correspondence table 117.

Figure 21:
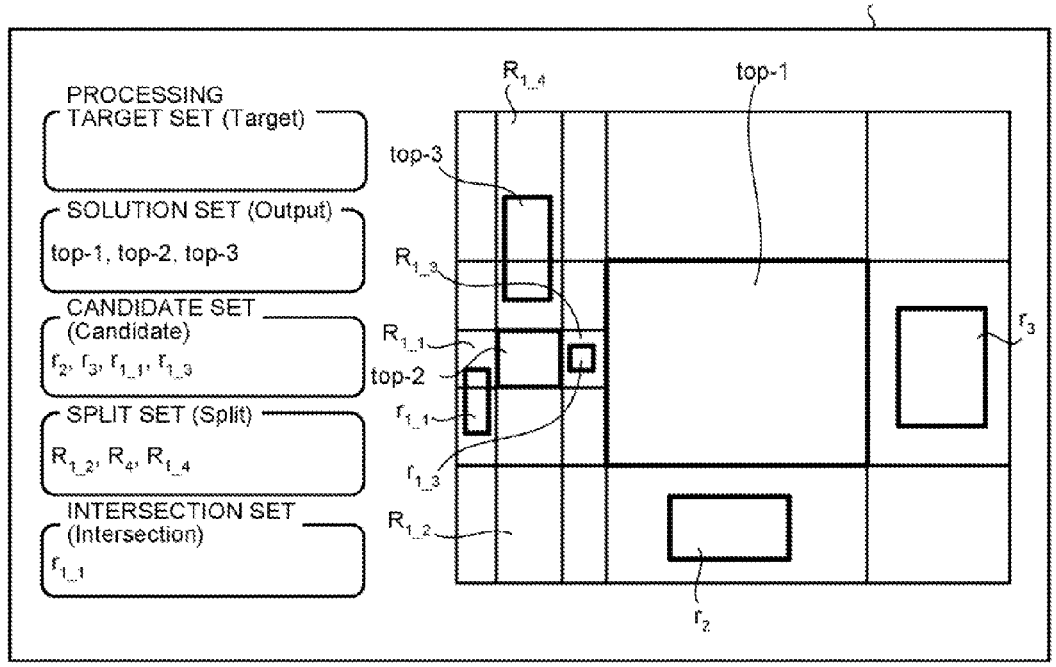
FIG. 21 is a diagram for describing the process of the finding unit in detail.

The description will be followed with reference to FIG. 21. Here, a case will be described in which the highest-score candidate area in the candidate set 114 is the candidate area $r_{1\_4}$. In such a case, the finding unit 122 selects the highest-score candidate area $r_{1\_4}$ from the candidate set 114 as an area top-3 and stores the selected area top-3 in the solution set 113 at S23. In addition, the finding unit 122 excludes the candidate area $r_{1\_4}$ from the candidate set 114 and stores the processing target area $R_{1\_4}$ corresponding to the candidate area $r_{1\_4}$ in the split set 115 by referring to the correspondence table. The finding unit 122 excludes the set of the candidate area $r_{1\_4}$ and the processing target area $R_{1\_4}$ corresponding thereto from the correspondence table 117.

Figure 22:
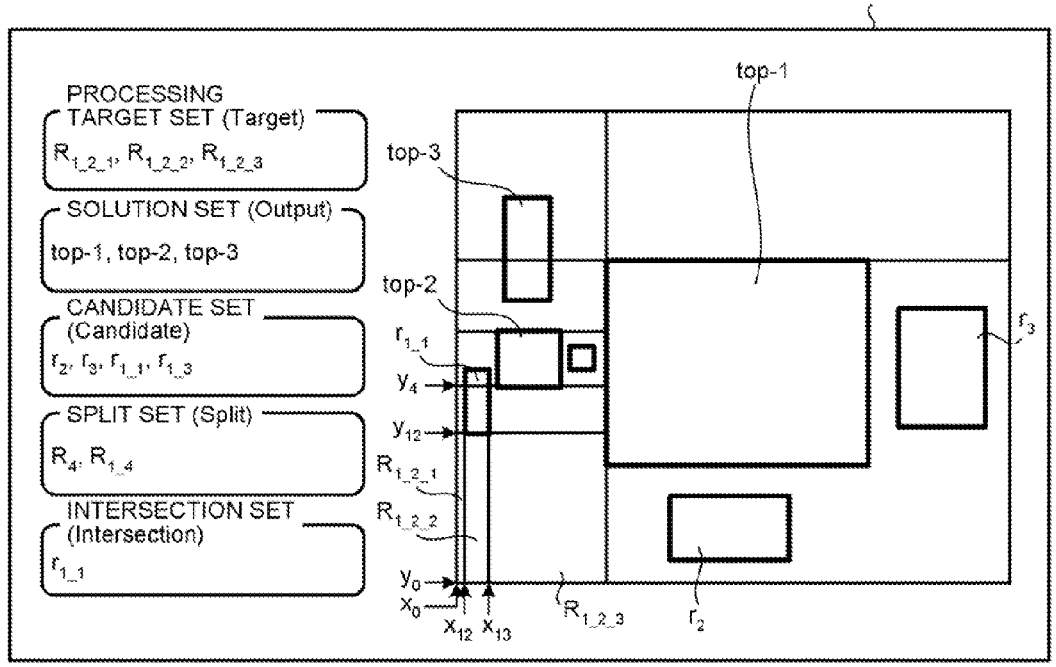
FIG. 22 is a diagram for describing the process of the finding unit in detail.

The description will be followed with reference to FIG. 22. The finding unit 122 acquires the processing target area $R_{1\_2}$ from the split set 115. Then, the finding unit 122 generates processing target areas $R_{1\_2\_1}$ to $R_{1\_2\_3}$ based on the processing target area $R_{1\_2}$ and stores the generated processing target areas $R_{1\_2\_1}$ to $R_{1\_2\_3}$ in the processing target set 112 at S24. Here, the processing target areas $R_{1\_2\_1}$ to $R_{1\_2\_3}$ can be represented as below by using the coordinates ($x_0$ to $x_{13}$) in the horizontal direction and the coordinates ($y_0$ to $y_{12}$) in the vertical direction.

$R_{1\_2\_1}$: ($x_0$, $y_0$)–($x_{12}$, $y_4$)
$R_{1\_2\_2}$: ($x_0$, $y_0$)–($x_2$, $y_{12}$)
$R_{1\_2\_3}$: ($x_{13}$, $y_0$)–($x_2$, $y_4$)

Figure 23:
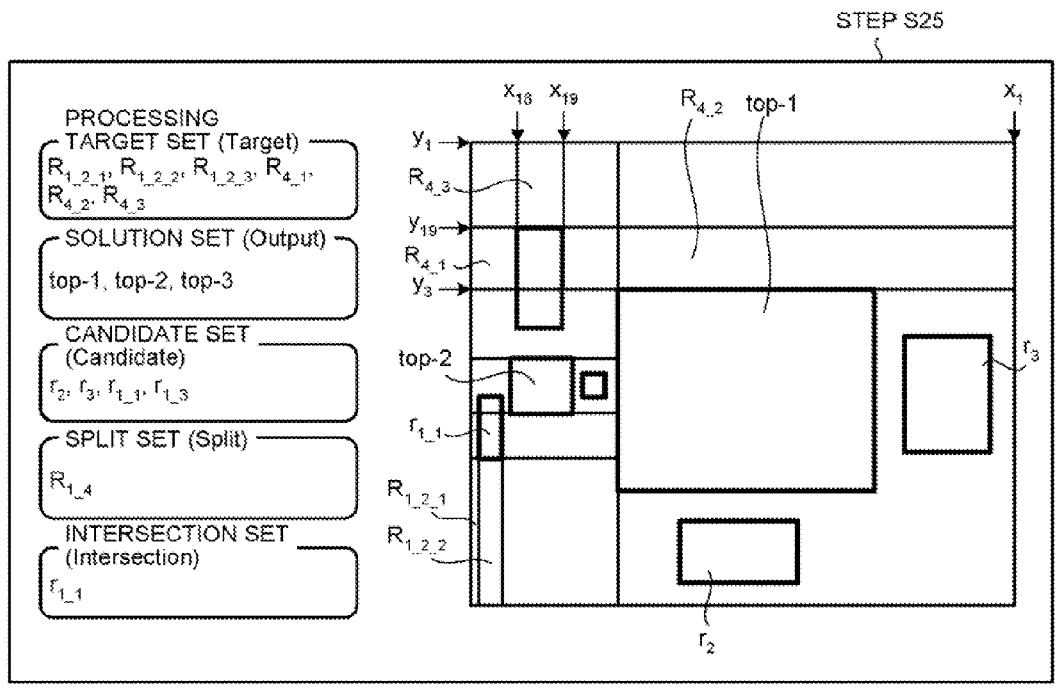
FIG. 23 is a diagram for describing the process of the finding unit in detail.

The description will be followed with reference to FIG. 23. The finding unit 122 acquires the processing target area $R_4$ from the split set 115. Then, the finding unit 122 generates processing target areas $R_{4\_1}$ to $R_{4\_3}$ based on the processing target area $R_4$ and stores the generated processing target areas $R_{4\_1}$ to $R_{4\_3}$ in the processing target set 112 at S25. Here, the processing target areas $R_{4\_1}$ to $R_{4\_3}$ can be represented as below by using the coordinates ($x_0$ to $x_{19}$) in the horizontal direction and the coordinates ($y_1$ to $y_{19}$) in the vertical direction.

$R_{4\_1}$: ($x_0$, $y_3$)–($x_{18}$, $y_1$)
$R_{4\_2}$: ($x_{19}$, $y_3$)–($x_1$, $y_1$)
$R_{4\_3}$: ($x_0$, $y_{19}$)–($x_1$, $y_1$)

Figure 24:
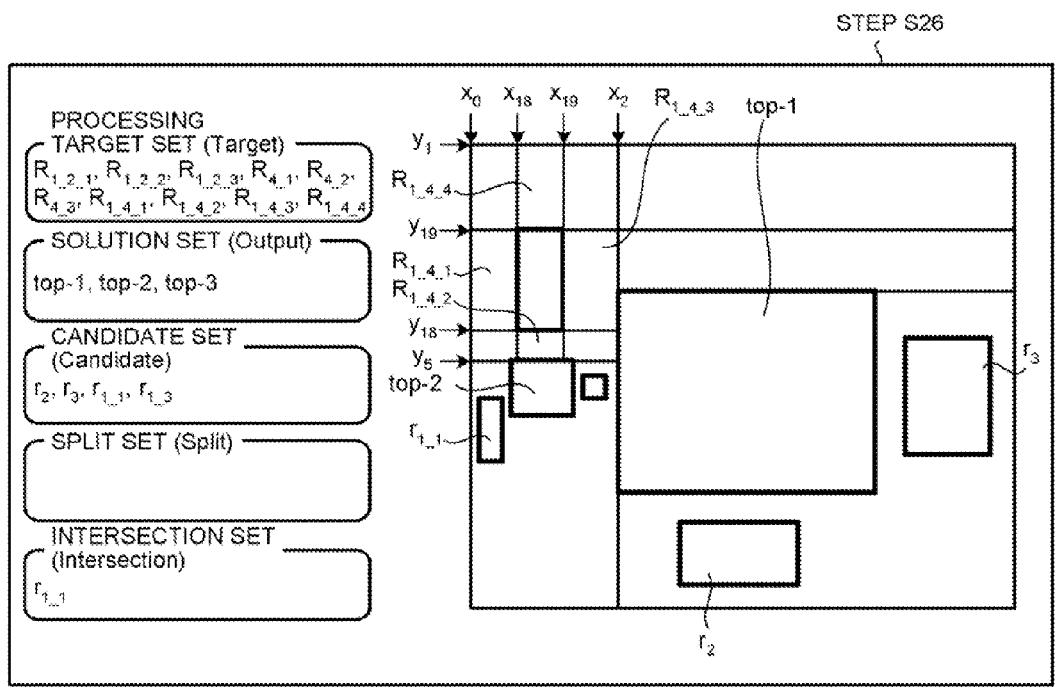
FIG. 24 is a diagram for describing the process of the finding unit in detail.

The description will be followed with reference to FIG. 24. The finding unit 122 acquires a processing target area $R_{1\_4}$ from the split set 115. Then, the finding unit 122 generates processing target areas $R_{1\_4\_1}$ to $R_{1\_4\_4}$ based on the processing target area $R_{1\_4}$ and stores the generated processing target areas $R_{1\_4\_1}$ to $R_{1\_4\_4}$ in the processing target set 112 at S26. Here, the processing target areas $R_{1\_4\_1}$ to $R_{1\_4\_4}$ can be represented as below by using the coordinates ($x_0$ to $x_{19}$) in the horizontal direction and the coordinates ($y_1$ to $y_{19}$) in the vertical direction.

$R_{1\_4\_1}$: ($x_0$, $y_5$)–($x_{18}$, $y_1$)
$R_{1\_4\_2}$: ($x_0$, $y_5$)–($x_2$, $y_{18}$)
$R_{1\_4\_3}$: ($x_{19}$, $y_5$)–($x_2$, $y_1$)
$R_{1\_4\_4}$: ($x_0$, $y_{19}$)–($x_2$, $y_1$)

As above, the finding unit 122 finds the top 3 areas top-1 to top-3 according to the score from the input data 111. In addition, in a case where a fourth-highest area or an area after that is further found, the finding unit 122 repeatedly performs a similar process.

As above, the finding unit 122 repeatedly performs a process of finding a solution area of the next rank from an area acquired by excluding the solution area that has been found from the area as a processing target and a process of determining whether or not the solution area intersects only with the candidate area that overlaps a plurality of the processing target areas, whereby the top k areas are found.

Now, the description will be presented by referring back to FIG. 1. The output controlling unit 123 outputs various kinds of information to the output device 102. For example, the output controlling unit 123 acquires the output data 118 from the storage unit 110 and outputs the acquired output data 118 to the output device 102.

Figure 25:
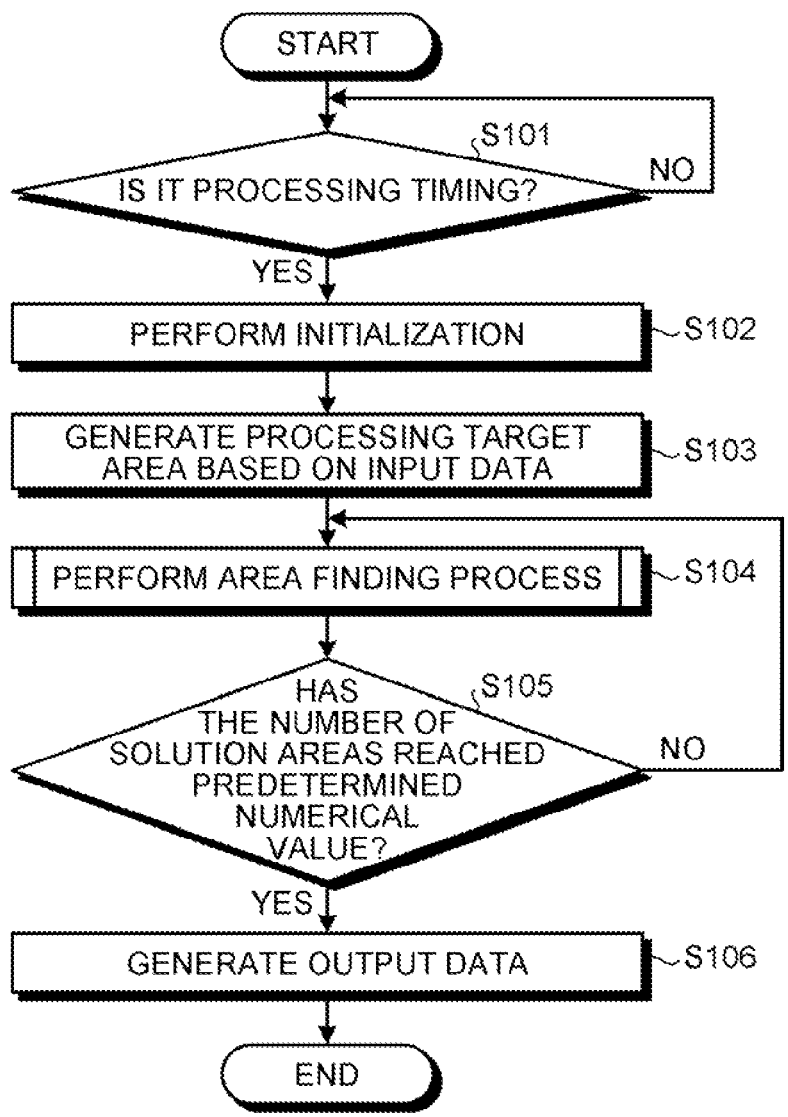
FIG. 25 is a flowchart illustrating the processing sequence of the area finding apparatus according to the first embodiment.

Next, the processing sequence of the area finding apparatus 100 according to the first embodiment will be described. FIG. 25 is a flowchart illustrating the processing sequence of the area finding apparatus according to the first embodiment. The process illustrated in FIG. 25, for example, is performed by being triggered by receiving the definition of the score using the receiving unit 121.

As illustrated in FIG. 25, when it is processing timing (Yes at S101), the finding unit 122 initializes the processing target set 112, the solution set 113, the candidate set 114, the split set 115, and the intersection set 116 to empty sets at S102. Then, the finding unit 122 generates a processing target area R based on the input data 111 and stores the processing target area in the processing target set 112 at S103. Then, the finding unit 122 performs an area finding process at S104.

Figure 26:
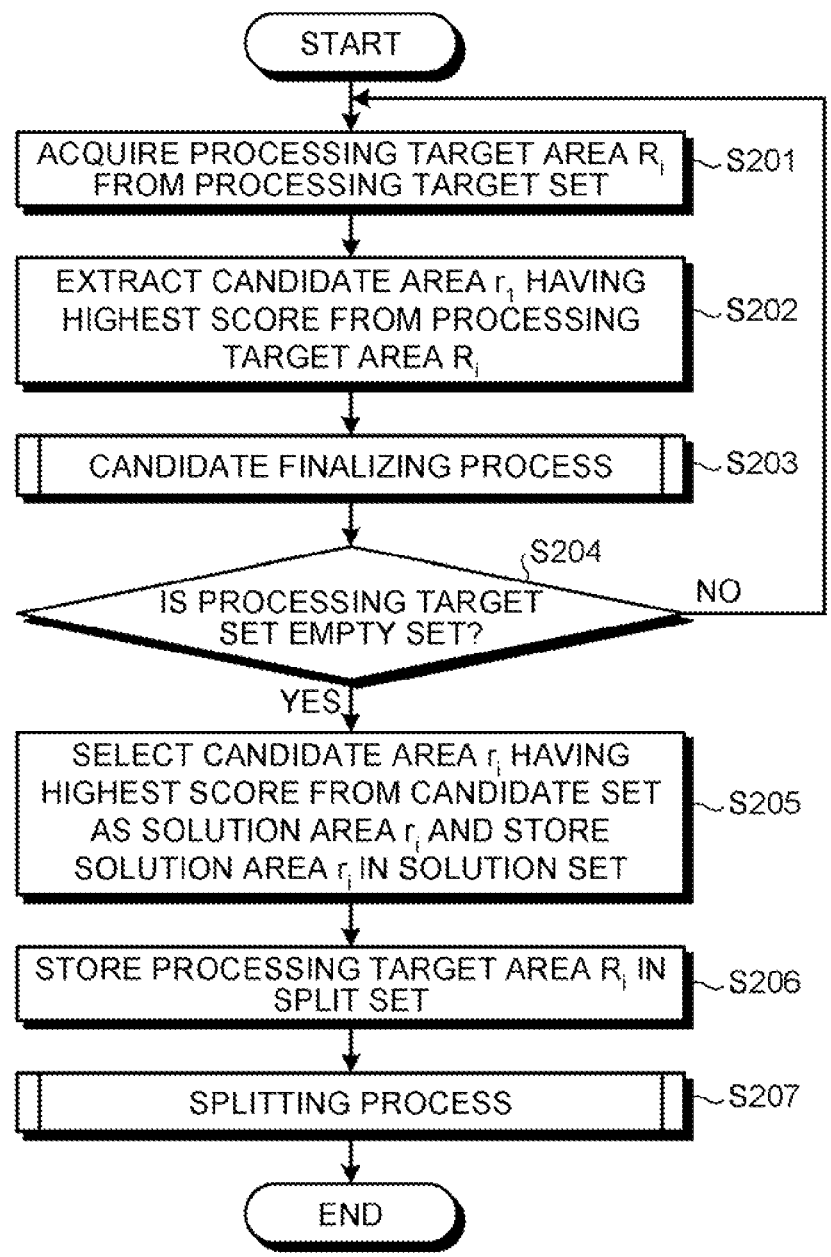
FIG. 26 is a flowchart illustrating the processing sequence of an area finding process.

Here, the processing sequence of the area finding process of S104 illustrated in FIG. 25 will be described with reference to FIG. 26. FIG. 26 is a flowchart illustrating the processing sequence of the area finding process.

As illustrated in FIG. 26, the finding unit 122 acquires one processing target area $R_i$ from the processing target set 112 at S201. The finding unit 122 extracts a highest-score candidate area $r_i$ from the processing target area $R_i$ at S202. Then, the finding unit 122 performs a candidate finalizing process at S203.

Figure 27:
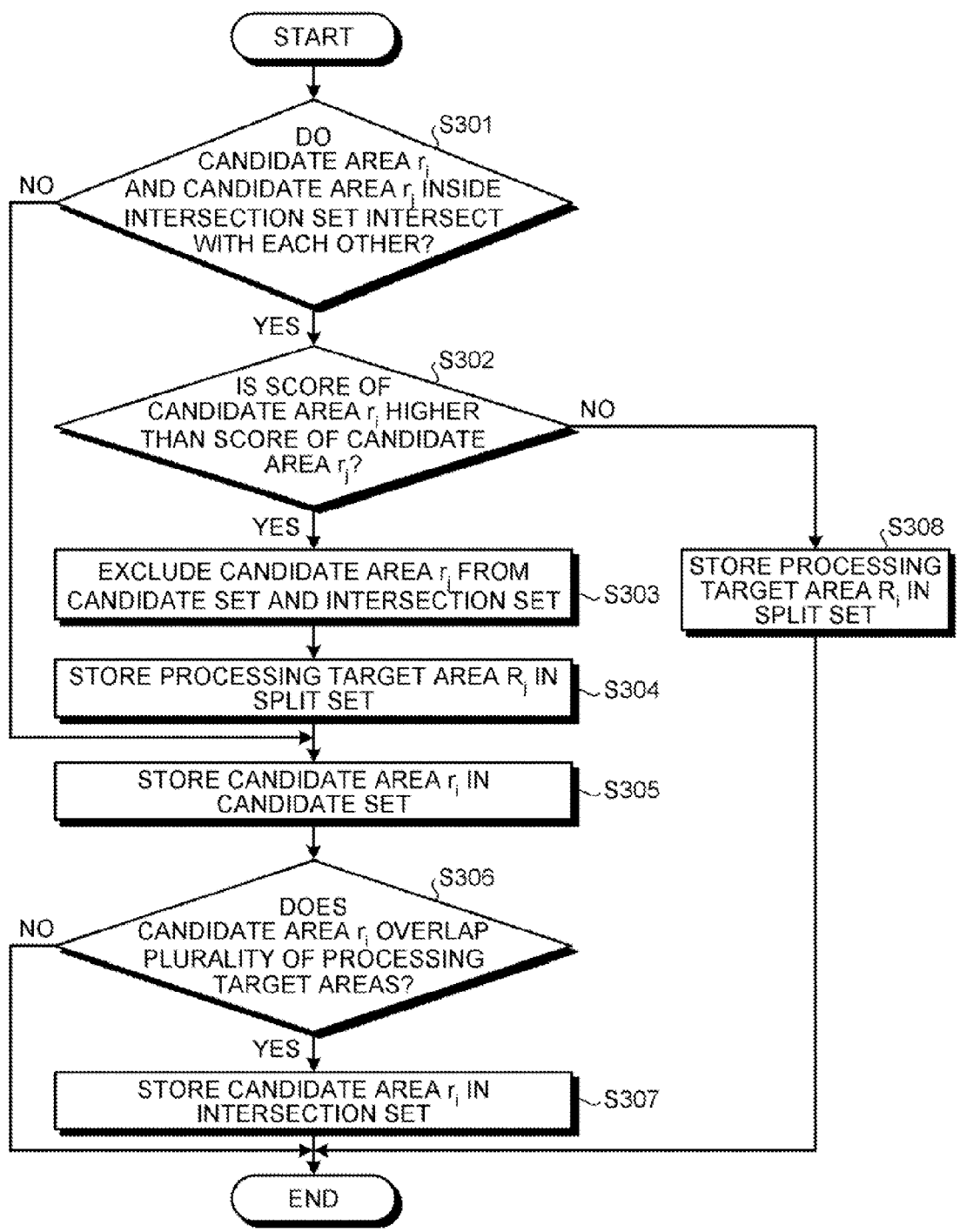
FIG. 27 is a flowchart illustrating the processing sequence of a candidate finalizing process.

Here, the candidate finalizing process of S203 illustrated in FIG. 26 will be described with reference to FIG. 27. FIG. 27 is a flowchart illustrating the processing sequence of the candidate finalizing process.

As illustrated in FIG. 27, the finding unit 122 determines whether or not the candidate area $r_i$ extracted in the process of S202 and a candidate area $r_j$ included in the intersection set 116 intersect with each other at S301. In a case where the candidate area $r_i$ and the candidate area $r_j$ intersect with each other (Yes at S301), the finding unit 122 determines whether or not the score of the candidate area $r_i$ is higher than the score of the candidate area $r_j$ at S302.

In a case where the score of the candidate area $r_i$ is higher than the score of the candidate area $r_j$ (Yes at S302), the finding unit 122 excludes the candidate area $r_j$ from the candidate set 114 and the intersection set 116 at S303. Then, the finding unit 122 stores the processing target area $R_j$ corresponding to the candidate area $r_j$ in the split set 115 by referring to the correspondence table 117 at S304. In addition, the finding unit 122 excludes a set of the candidate area $r_j$ and the processing target area $R_j$ corresponding thereto from the correspondence table 117.

The finding unit 122 finalizes the candidate area $r_i$ as a candidate area and stores the candidate area $r_i$ in the candidate set 114 at S305. The finding unit 122 determines whether or not the candidate area $r_i$ overlaps a plurality of the processing target areas at S306. In a case where the candidate area $r_i$ overlaps the plurality of the processing target areas (Yes at S306), the finding unit 122 stores the candidate area $r_i$ in the intersection set 116 at S307 and ends the candidate finalizing process.

On the other hand, in a case where the candidate area $r_i$ does not overlap the plurality of the processing target areas (No at S306), the finding unit 122 ends the candidate finalizing process.

On the other hand, in a case where the score of the candidate area $r_i$ is lower than the score of the candidate area $r_j$ (No at S302), the finding unit 122 stores the processing target area $R_i$ corresponding to the candidate area $r_i$ in the split set 115 by referring to the correspondence table 117 at S308. In addition, the finding unit 122 excludes the set of the candidate area $r_i$ and the processing target area $R_i$ corresponding thereto from the correspondence table 117.

On the other hand, in a case where the candidate area $r_i$ and the candidate area $r_j$ do not intersect with each other (No at S301), the process proceeds to the process of S305.

Now, the description will be represented with reference back to FIG. 26. The finding unit 122 determines whether or not the processing target set 112 is an empty set at S204. In a case where the processing target set 112 is not an empty set (No at S204), the finding unit 122 proceeds to the process of S201, and the process from S201 to S204 is repeated until the processing target set 112 is an empty set.

On the other hand, in a case where the processing target set 112 is an empty set (Yes at S204), the finding unit 122 selects a highest-score candidate area $r_i$ from the candidate set 114 as a solution area $r_i$ and stores the solution area $r_i$ in the solution set 113 at S205. The finding unit 122 stores the processing target area $R_i$ corresponding to the solution area $r_i$ in the split set 115 by referring to the correspondence table 117 at S206. In addition, the finding unit 122 excludes the set of the candidate area $r_i$ and the processing target area $R_i$ corresponding thereto from the correspondence table 117. Then, the finding unit 122 performs the splitting process at S207.

Figure 28:
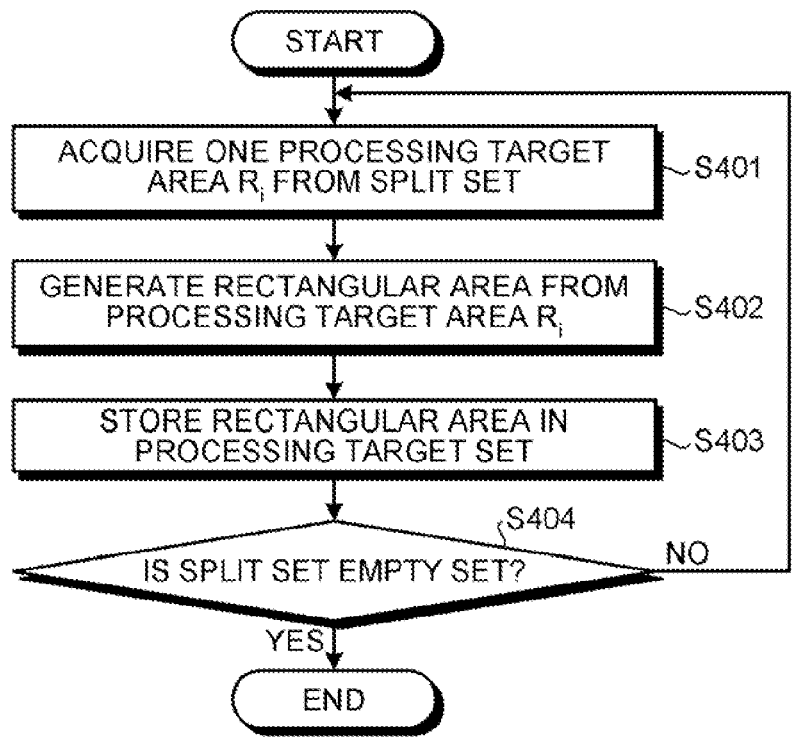
FIG. 28 is a flowchart illustrating the processing sequence of a splitting process.

Here, the processing sequence of the splitting process of S207 illustrated in FIG. 26 will be described with reference to FIG. 28. FIG. 28 is a flowchart illustrating the processing sequence of the splitting process.

As illustrated in FIG. 28, the finding unit 122 acquires one processing target area $R_i$ from the split set 115 at S401. The finding unit 122 generates one or a plurality of rectangular areas based on the processing target area $R_i$ at S402.

The finding unit 122 stores the generated rectangular area in the processing target set 112 as a processing target area at S403. The finding unit 122 determines whether or not the split set 115 is an empty set at S404. In a case where the split set 115 is the empty set (Yes at S404), the finding unit 122 ends the splitting process.

On the other hand, in a case where the split set 115 is not an empty set (No at S404), the finding unit 122 proceeds to the process of S401 and repeats the process from S401 to S404 until the split set 115 is an empty set.

Now, the description will be presented with reference back to FIG. 25. The finding unit 122 determines whether or not the number of solution areas found in the area finding process of S104 has reached a predetermined numerical value at S105. In a case where the number of solution areas has reached the predetermined numerical value (Yes at S105), the finding unit 122 generates the output data 118 based on the information of areas included in the solution set 113 at S106.

On the other hand, in a case where the number of solution areas has not reached the predetermined numerical value (No at S105), the finding unit 122 proceeds to the area finding process of S104 and repeats the process of S104 and S105 until the number of solution areas reaches the predetermined numerical value.

Here, the above-described processing sequence is not limited to the above-described order and may be appropriately changed in the range in which the processing contents are not contradictory to each other. For example, the splitting process described at S207 may not be necessarily performed after the process of S206 and may be performed after a negative determination is made in the process of S105.

Next, the advantages of the area finding apparatus 100 according to the first embodiment will be described. The area finding apparatus 100 stores data that represents a plurality of points that can be distributed at two-dimensional coordinates. The area finding apparatus 100 extracts a rectangular area having the highest score calculated based on the evaluation values of points from a processing target area that includes a set of a plurality of the points, which are stored, as a candidate area that is a candidate for a solution. The area finding apparatus 100 determines whether or not the extracted candidate area and the candidate area overlapping a plurality of the processing target areas out of the other candidate areas intersect with each other. In a case where the candidate areas intersect with each other, the area finding apparatus 100 excludes the candidate area having a lower score out of the extracted candidate area and the other candidate areas and finalizes the candidate area having a higher score. On the other hand, in a case where the candidate areas do not intersect with each other, the area finding apparatus 100 finalizes the extracted candidate area. Then, the area finding apparatus 100 selects a candidate area having the highest score out of the finalized candidate areas as a solution area. The area finding apparatus 100 generates one or a plurality of rectangular areas as processing target areas based on an area acquired by excluding the solution area from the processing target area from which the selected solution area has been extracted and an area acquired by excluding the excluded candidate area from the processing target area from which the excluded candidate area has been extracted. The area finding apparatus 100 extracts a candidate area from the generated processing target area, finalizes the candidate area, and selects a solution area until solution areas corresponding to a predetermined number are selected. As above, since the area finding apparatus 100 extracts the candidate area of the next rank from the area acquired by excluding the solution area that has been found from the processing target area, a determination of the intersection between the extracted candidate area and the solution area is not necessary, whereby the problem of finding top k areas having no intersection therebetween can be efficiently solved.

In addition, since the area finding apparatus 100 temporality stores a candidate area overlapping a plurality of the processing target areas and determines the intersection between the extracted candidate area and the candidate area that has been temporarily stored, the number of the intersection determination processes can be decreased, and accordingly, the problem of finding top k areas having no intersection therebetween can be efficiently solved.

Described in detail, for example, while a time taken to find top three areas from a set including point data of 100 points is about one hour (4,300 seconds) in a case where the conventional technique is used, the time is about 1.03 seconds in the area finding apparatus 100. In addition, while a time taken to find top three areas from a set including point data of 200 points is about 20 hours by using the conventional technique, the time is about 5.74 seconds in the area finding apparatus 100. Furthermore, while a time taken to find top three areas from a set including point data of 1000 points is immeasurable in a case where the conventional technique is used, the time is about 445 seconds in the area finding apparatus 100. As above, while the conventional technique is not tolerable for practical uses, the area finding apparatus 100 can efficiently solve the problem of finding top k areas having no intersection therebetween.

Figure 29:
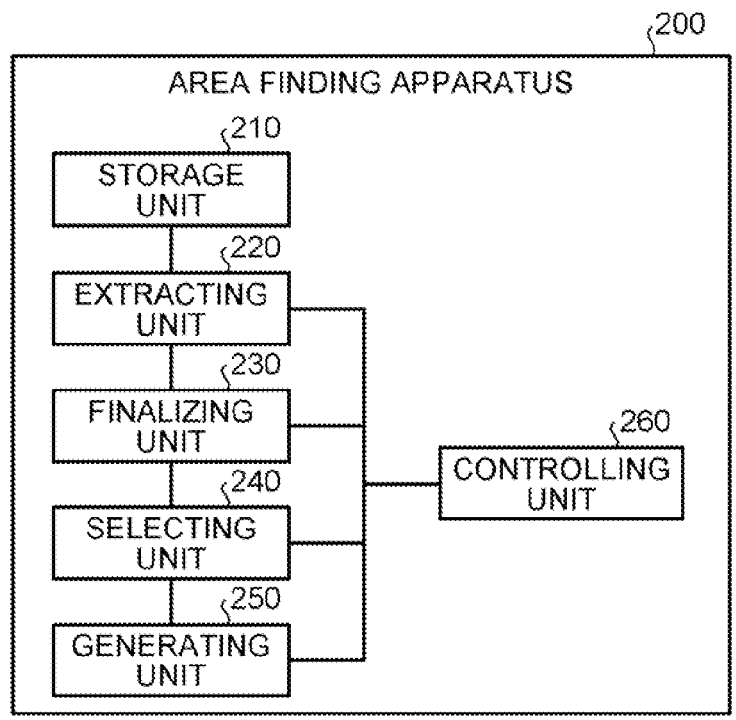
FIG. 29 is a diagram illustrating an example of the configuration of the area finding apparatus according to the first embodiment.

However, the configuration of the area finding apparatus 100 illustrated in FIG. 1 is an example, and the area finding apparatus 100 may not necessarily include each processing unit illustrated in FIG. 1. For example, as illustrated in FIG. 29, an area finding apparatus 200 includes a storage unit 210, an extracting unit 220, a finalizing unit 230, a selecting unit 240, a generating unit 250, and a controlling unit 260. In addition, the storage unit 210 illustrated in FIG. 29 corresponds to the input data 111 illustrated in FIG. 1. Furthermore, the extracting unit 220, the finalizing unit 230, the selecting unit 240, the generating unit 250, and the controlling unit 260 illustrated in FIG. 29 correspond to the finding unit 122 illustrated in FIG. 1. FIG. 29 is a diagram illustrating an example of the configuration of the area finding apparatus according to the first embodiment.

In other words, the storage unit 210 stores data representing a plurality of points that can be distributed at two-dimensional coordinates. The extracting unit 220 extracts a rectangular area having the highest score calculated based on the evaluation values of points from a processing target area including a set of a plurality of points stored in the storage unit 210 as a solution candidate that is a candidate for a solution. The finalizing unit 230 determines whether or not the solution candidate extracted by the extracting unit 220 and a solution candidate overlapping a plurality of the processing target areas out of the other solution candidates intersect with each other. In a case where the solution candidates intersect with each other, the finalizing unit 230 excludes the solution candidate having a lower score out of the extracted solution candidate and the other solution candidate from the solution candidate and finalizes the solution candidate having a higher score as a solution candidate. On the other hand, in a case where the solution candidates do not intersect with each other, the finalizing unit 230 finalizes the extracted solution candidate as a solution candidate. The selecting unit 240 selects the solution candidate having the highest score from among solution candidates finalized by the finalizing unit 230 as a solution area. The generating unit 250 generates one or a plurality of rectangular areas as processing target areas from an area acquired by excluding the solution area from the processing target area from which the solution area selected by the selecting unit 240 has been extracted. In addition, the generating unit 250 generates one or a plurality of rectangular areas as processing target areas from an area acquired by excluding the excluded solution candidate from the processing target area from which the excluded solution candidate excluded by the finalizing unit 230 has been extracted. The controlling unit 260 extracts a solution candidate from the processing target area generated by the generating unit 250 by using the extracting unit 220, finalizes the solution candidate by using the finalizing unit 230, and selects the solution area by using the selecting unit 240 until solution areas corresponding to a predetermined number are selected by the selecting unit 240.

[b] Second Embodiment

Although an embodiment of the invention has been described until now, the invention may be performed as embodiments other than the above-described embodiment. Thus, hereinafter, the other embodiments will be described.

For example, in the first embodiment described above, although a case has been described in which the areas are to be found in the descending order of the score, the invention is not limited thereto. For example, the area finding apparatuses 100 and 200 may be configured to find the areas in the ascending order of the score. In other words, the extracting unit 220 included in the area finding apparatus 200 extracts a rectangular area having the lowest score calculated based on the evaluation values of points from a processing target area including a set of a plurality of points stored in the storage unit 210 as a solution candidate that is a candidate for a solution. The finalizing unit 230 determines whether or not the solution candidate extracted by the extracting unit 220 and a solution candidate overlapping a plurality of processing target areas out of the other solution candidates intersect with each other. In a case where the solution candidates intersect with each other, the finalizing unit 230 excludes the solution candidate having a higher score out of the extracted solution candidate and the other solution candidates from the solution candidate, finalizes the solution candidate having a lower score as the solution candidate. On the other hand, in a case where the solution candidates do not intersect with each other, the finalizing unit 230 finalizes the extracted solution candidate as the solution candidate. The selecting unit 240 selects the solution candidate having the lowest score out of the solution candidates finalized by the finalizing unit 230 as the solution area.

In addition, for example, in the first embodiment described above, although a case has been described in which the definition of the score is the sum of the evaluation values of each point data, the invention is not limited thereto. For example, as the definition of the score, a total number of points having point data of a specific evaluation value may be set. In other words, in a case where each point data has one value of "1", "2", and "3" as the evaluation value, for example, the area finding apparatus 100 may calculate the total number of points having point data that has an evaluation value of "2" as the score.

Furthermore, for example, among the processes described in the first embodiment, the whole or a part of the process that has been described to be automatically performed may be performed manually, or the whole or a part of the process that has been described to be manually performed may be performed automatically by using a known method. For example, although the process illustrated in FIG. 25 has been described to be triggered by receiving the definition of the score, a user using the area finding apparatus 100 may manually perform the process at arbitrary timing. In addition, the processing sequence, the control sequence, specific names, or the information including various kinds of data or various parameters represented in the description or the drawings presented above may be arbitrary changed unless otherwise mentioned. In the example illustrated in FIG. 3, although the processing target set 112 has been described to include information in which the "leftLow" and the "rightUp" are associated with each other, information in which a "leftUp" and a "rightLow" are associated with each other may be included therein. In other words, as the method of representing a rectangular area, a method may be used in which the rectangular area is represented by using the upper left coordinates and the lower right coordinates.

In addition, each constituent element of the area finding apparatuses 100 and 200 illustrated in FIGS. 1 and 29 is functional and conceptual and does not necessarily need to be physically configured as illustrated in the drawings. In other words, the specific form of the separation/integration of the area finding apparatus 100 or 200 is not limited to that illustrated in the drawings, and the whole or a part thereof may be configured to be functionally or physically separated or integrated in arbitrary units in accordance with various loads, the situation of the use, and the like. For example, the processing target set 112, the solution set 113, the candidate set 114, the split set 115, the intersection set 116, and the correspondence table 117 illustrated in FIG. 1 may not be included in the storage unit 110. Thus, the internal memory of the controlling unit 120 may include the processing target set 112, the solution set 113, the candidate set 114, the split set 115, the intersection set 116, and the correspondence table 117.

Furthermore, the area finding apparatuses 100 and 200 may be realized by mounting the functions of the area finding apparatuses 100 and 200 in an existing information processing apparatus. The existing information apparatus corresponds to an apparatus such as a personal computer, a workstation, a cellular phone, a personal handy-phone system (PHS) terminal, a mobile communication terminal, or a personal digital assistant (PDA).

Figure 30:
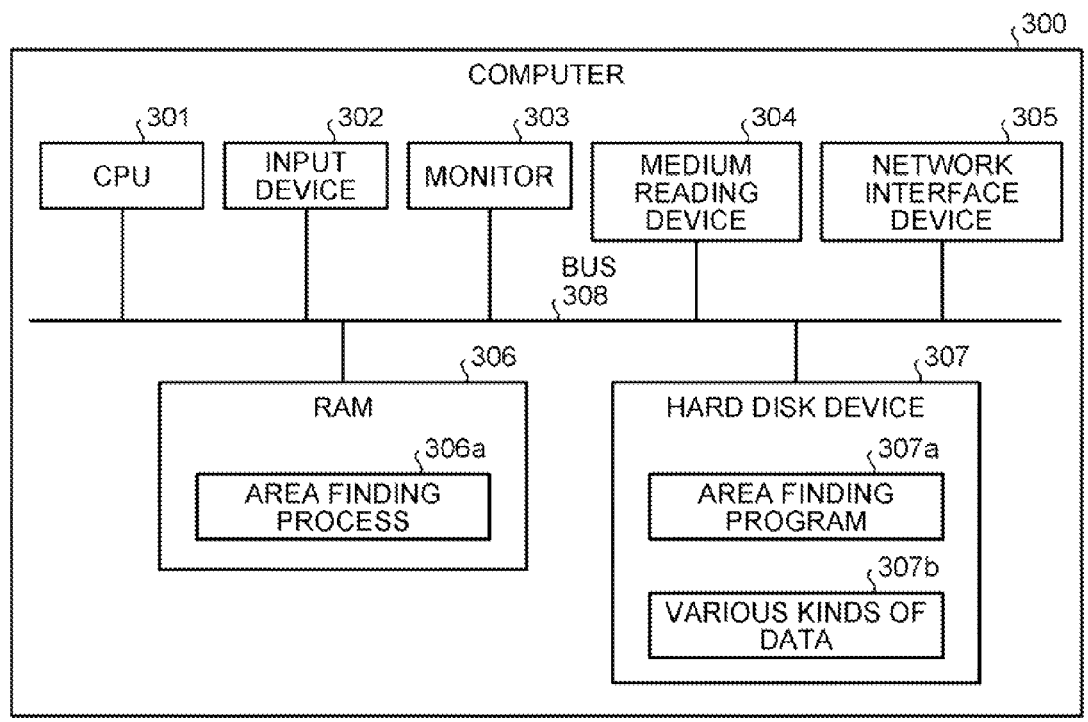
FIG. 30 is a diagram illustrating an example of a computer that executes an area finding program.
Figure 31:
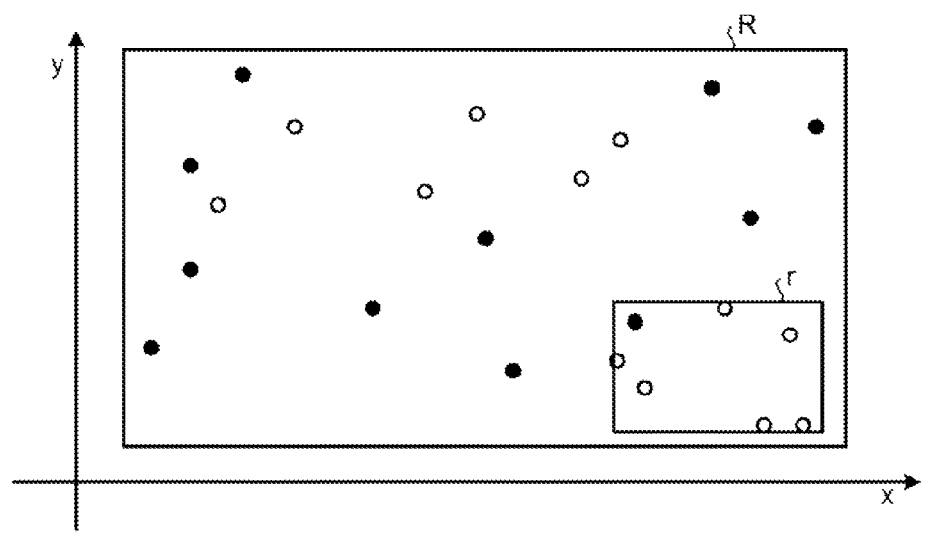
FIG. 31 is a diagram for describing a conventional technique.

FIG. 30 is a diagram illustrating an example of a computer that executes an area finding program. As illustrated in FIG. 30, a computer 300 includes a CPU 301 that performs various calculation processes, an input device 302 that receives an input of data from a user, and a monitor 303. In addition, the computer 300 includes a medium reading device 304 that reads out a program or the like from a storage medium and a network interface device 305 that receives/transmits data from/to other devices. Furthermore, the computer 300 includes a random access memory (RAM) 306 that temporarily stores various kinds of information and a hard disk device 307. The devices 301 to 307 are connected to a bus 308.

The hard disk device 307 stores an area finding program 307a that has the same functions as those of the processing parts of the finding unit 122 illustrated in FIG. 1, the extracting unit 220, the finalizing unit 230, the selecting unit 240, the generating unit 250, and the controlling unit 260 illustrated in FIG. 29. In addition, the hard disk device 307 stores various kinds of data 307b used for realizing the area finding program 307a. The various kinds of data 307b, for example, include data representing a plurality of points that can be distributed at two-dimensional coordinates.

By reading out the area finding program 307a from the hard disk device 307, expanding the area finding program in the RAM 306, and executing the area finding program by using the CPU 301, the area finding program 307a serves as an area finding process 306a. In other words, the area finding program 307a serves as the same processes as those of the processing parts of the finding unit 122 illustrated in FIG. 1, the extracting unit 220, the finalizing unit 230, the selecting unit 240, the generating unit 250, and the controlling unit 260 illustrated in FIG. 29.

In addition, the above-described area finding program 307a does not necessarily need to be stored in the hard disk device 307. For example, the computer 300 may read out and execute a program stored in a computer-readable recording medium. The computer-readable recoding medium corresponds to a portable recording medium such as a CD-ROM, a DVD disc, or a USB memory, a semiconductor memory such as a flash memory, a hard disk drive, or the like. In addition, it may be configured such that the program is stored in a device connected to a public line, the Internet, a local area network (LAN), or the like and the computer 300 reads out the program from the device and executes the program.

According to an aspect of the technique described in the present application, an advantage of solving the problem of finding top k areas having no intersection therebetween with high efficiency can be acquired.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program causing a computer to find an area process comprising:
   storing data in a memory representing a plurality of points that can be distributed at two-dimensional coordinates;
   extracting a candidate area having a highest score or a lowest score that is calculated based on evaluation values of points from a processing target area including a set of a plurality of points stored in the memory, the candidate area being one of a candidate for solution areas and represented as a rectangular area;
   determining whether the candidate area extracted at the extracting and one or a plurality of candidate areas overlapping a plurality of a processing target areas out of other candidate areas extracted from other processing target areas intersect with each other;
   deleting a candidate area having a lower score or a higher score out of the candidate areas determined to intersect with each other at the determining;
   selecting a candidate area as a solution area having a highest score or a lowest score out of the candidate area extracted at the extracting and not deleted at the deleting;
   generating one or a plurality of candidate areas as the processing target areas based on an area acquired by excluding the candidate area selected at the selecting from the processing target area from which the candidate area has been extracted and an area acquired by excluding the candidate area deleted at the deleting from the processing target area from which the candidate area has been extracted; and
   controlling, until a rectangular areas corresponding to a predetermined number are selected at the selecting, to extract the candidate area from the processing target area generated at the generating and to determine whether the candidate areas intersect with each other determined at determining.

2. A method of finding an area that is executed by a computer, the method comprising:
   extracting a candidate area having a highest score or a lowest score that is calculated based on evaluation values of points from a processing target area including a set of a plurality of the points stored in a storage unit, which stores data representing a plurality of points that can be distributed at two-dimensional coordinates;
   generating one or a plurality of candidate areas as a processing target areas based on an area acquired by excluding the candidate area from the processing target area, the candidate area being one of a candidate for solution areas and represented as a rectangular area;
   extracting a candidate area having a highest score or a lowest score from the processing target areas generated at the generating for each one of the processing target areas;
   storing the candidate area in a temporary storage unit temporarily in a case where the candidate area extracted at the extracting overlaps a plurality of the processing target areas;
   determining whether the candidate area extracted at the extracting and the candidate areas that is temporarily stored intersect with each other, and deletes a candidate area having a lower score or a higher score out of candidate area determined to intersect with each other;
   selecting a candidate area as a solution area having the highest score or the lowest score out of the candidate area extracted at the extracting and not deleted at the determining;
   generating one or a plurality of candidate areas as the processing target areas based on an area acquired by excluding the candidate area selected at the selecting from the processing target area from which the candidate area has been extracted and an area acquired by excluding the candidate area deleted at the determining from the processing target area from which the candidate area has been extracted; and
   controlling, by a processor, until a rectangular areas corresponding to a predetermined number are selected at the selecting, to extract the candidate area from the processing target area generated at the generating and to determine whether the candidate areas intersect with each other determined at determining.

3. An area finding apparatus comprising:
   a processor; and
   a memory that stores data representing a plurality of points that can be distributed at two-dimensional coordinates, wherein the processor executes:
   extracting a candidate area having a highest score or a lowest score that is calculated based on evaluation values of points from a processing target area including a set of a plurality of the points stored in the memory, the candidate area being one of a candidate for solution areas and represented as a rectangular area;
   determining whether the candidate area extracted at the extracting and one or a plurality of candidate areas overlapping a plurality of a processing target areas out of other candidate areas that extracted from other processing target areas intersect with each other;
   deleting a candidate area having a lower score or a higher score out of the candidate areas determined to intersect with each other at the determining;
   selecting a candidate area as a solution area having a highest score or a lowest score out of the candidate area extracted the extracting and not deleted at the deleting;
   generating one or a plurality of candidate areas as the processing target areas based on an area acquired by excluding the candidate area selected at the selecting from the processing target area from which the candidate area has been extracted and an area acquired by excluding the candidate area deleted at the deleting from the processing target area from which the candidate area has been extracted; and
   controlling, until a rectangular areas corresponding to a predetermined number are selected at the selecting, to extract the candidate area from the processing target area generated at the generating and to determine whether the candidate areas intersect with each other determined at the determining.

4. The area finding apparatus according to claim 3, wherein the processor further executes:
   temporarily storing a candidate area overlapping a plurality of the processing target areas out of the other candidate areas that extracted from the other processing target areas therein,
   wherein the determining determines whether the candidate area extracted by the extracting and the candidate area that is temporarily stored at the temporarily storing intersect with each other, and the deleting deletes a candidate area having a lower score or a higher score out of candidate area determined to intersect with each other and stored at the temporarily storing.

* * * * *